US012804525B2

(12) United States Patent
Li et al.

(10) Patent No.: US 12,804,525 B2
(45) Date of Patent: Nov. 17, 2026

(54) COMMUNICATION METHOD AND APPARATUS FOR SELECTING EDGE APPLICATION SERVERS

(71) Applicant: HUAWEI TECHNOLOGIES CO., LTD., Shenzhen (CN)

(72) Inventors: Yongcui Li, Beijing (CN); Cuili Ge, Beijing (CN); Hui Ni, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 18/689,777

(22) PCT Filed: Jul. 22, 2022

(86) PCT No.: PCT/CN2022/107439

§ 371 (c)(1),
(2) Date: Mar. 6, 2024

(87) PCT Pub. No.: WO2023/011217

PCT Pub. Date: Feb. 9, 2023

(65) Prior Publication Data

US 2025/0081089 A1 Mar. 6, 2025

(30) Foreign Application Priority Data

Aug. 6, 2021 (CN) ........................ 202110900781.X

(51) Int. Cl.
*H04W 48/16* (2009.01)
*H04L 41/14* (2022.01)
(Continued)

(52) U.S. Cl.
CPC ............. *H04W 48/16* (2013.01); *H04L 41/14* (2013.01); *H04L 61/4511* (2022.05); *H04L 61/5007* (2022.05)

(58) Field of Classification Search
CPC ....... H04W 48/08; H04W 48/16; H04W 8/08; H04W 24/02; H04W 88/14; H04W 4/20;
(Continued)

(56) References Cited

U.S. PATENT DOCUMENTS

2022/0263788 A1* 8/2022 Lee ..................... H04L 61/4511
2023/0308951 A1* 9/2023 Zhang ................... H04W 28/14

FOREIGN PATENT DOCUMENTS

CN 113630272 A 11/2021

OTHER PUBLICATIONS

"3rd Generation Partnership Project; Technical Specification Group Services and System Aspects; System architecture for the 5G System (5GS); Stage 2 (Release 17)," 3GPP TS 23.501 V17.1.1, total 526 pages (Jun. 2021).
(Continued)

*Primary Examiner* — Peter Chen
(74) *Attorney, Agent, or Firm* — Leydig, Voit & Mayer, Ltd.

(57) ABSTRACT

A communication method and apparatus are provided. A session management function network element receives first information from an edge application server discovery function network element, where the first information comprises internet protocol (IP) address information of N edge application servers (EASs), and N is an integer greater than or equal to 2. The session management function network element determines an EAS IP address information set based on the IP address information of the N EASs, where the EAS IP address information set comprises IP address information of M EASs, the IP address information of the M EASs corresponds to a same data network access identifier (DNAI), and M is an integer less than or equal to N. The session management function network element sends the
(Continued)

EAS IP address information set to the edge application server discovery function network element.

20 Claims, 15 Drawing Sheets

(51) Int. Cl.
*H04L 61/4511* (2022.01)
*H04L 61/5007* (2022.01)

(58) Field of Classification Search
CPC ........ H04W 28/06; H04L 41/12; H04L 41/14; H04L 41/0894; H04L 41/0803; H04L 61/4511; H04L 61/5007; H04L 67/14; H04L 67/10015; H04L 67/1021
See application file for complete search history.

(56) References Cited

OTHER PUBLICATIONS

Nokia et al., "Updates to EAS Discovery Procedure with EASDF (§ 6.2.3.2.2)," SA WG2 Meeting #143e, S2-2102160; Elbonia, Total 7 pages (Apr. 12-16, 2021).
"3rd Generation Partnership Project; Technical Specification Group Services and System Aspects; Study on enhancement of support for Edge Computing in 5G Core network (5GC) (Release 17)," 3GPP TR 23.748 V1.2.0, total 250 pages (Nov. 2020).
"3rd Generation Partnership Project; Technical Specification Group Services and System Aspects; 5G System Enhancements for Edge Computing; Stage 2 (Release 17)," 3GPP TS 23.548 V0.2.0, total 46 pages (Apr. 2021).
"3rd Generation Partnership Project; Technical Specification Group Services and System Aspects;Procedures for the 5G System (5GS); Stage 2 (Release 17)," 3GPP TS 23.502 V17.1.0, total 692 pages (Jun. 2021).
Tencent, "Update of the EAS discovery procedure with EASDF," SA WG2 Meeting #146E (e-meeting), S2-2106140, 3rd Generation Partnership Project (3GPP), Mobile Competence Centre; 650, Route Deslucioles; F-06921 Sophia-Antipolis Cedex; France, XP052053864, Total 6 pages (Aug. 16-27, 2021).
Lenovo et al., "SMF selecting an EAS application server by taking into account NWDAF analytics," 3GPP TSG-SA WG2 Meeting #145e, S2-2104614, 3rd Generation Partnership Project (3GPP), Mobile Competence Centre; 650, Route Deslucioles; F-06921 Sophia-Antipolis Cedex; France, XP052004911, total 7 pages (May 17-28, 2021).
Huawei et al., "Clarification on EAS discovery via EASDF," 3GPP TSG-SA WG2 Meeting #145E, S2-2104384, 3rd Generation Partnership Project (3GPP), Mobile Competence Centre; 650, Route Deslucioles; F-06921 Sophia-Antipolis Cedex; France, XP052004694, total 7 pages (May 17-28, 2021).

* cited by examiner

COMMUNICATION METHOD AND APPARATUS FOR SELECTING EDGE APPLICATION SERVERS

CROSS-REFERENCE TO RELATED APPLICATIONS

This application is a national stage of International Application No. PCT/CN2022/107439, filed on Jul. 22, 2022, which claims priority to Chinese Patent Application No. 202110900781.X, filed on Aug. 6, 2021. Both of the aforementioned applications are hereby incorporated by reference in their entireties.

TECHNICAL FIELD

This application relates to the field of communication technologies, and in particular, to a communication method and apparatus.

BACKGROUND

To effectively satisfy high-bandwidth and low-latency requirements needed by rapid development of a mobile internet and an internet of things and reduce network load, the European telecommunication standard institute (ETSI) proposed a mobile edge computing (MEC) technology. The MEC technology may provide a low-latency and high-bandwidth service for a user.

MEC may be implemented by using a domain name system (DNS) technology. Specifically, an edge application server discovery function (EASDF) network element is introduced in the MEC to implement at least one of the following functions: receiving, by the EASDF, a DNS message processing rule sent by a session management function network element, sending a DNS message to a DNS server, and adding an extension mechanisms for DNS client subnet ((extension mechanisms for DNS, EDNS) ECS) option to a DNS query message. Through the ECS option, the DNS server can return an edge application server (EAS) internet protocol (IP) address that matches the ECS option. Further, the EASDF network element can return the EAS IP to the session management function network element, so that the session management function network element inserts a service traffic routing point for a terminal device. In this way, the terminal device can access a corresponding EAS nearby.

However, when the DNS server returns a plurality of EAS IPs, and the plurality of EAS IPs correspond to different data network access identifiers (DNAI), there has been no implementation method for determining a location of the service traffic routing point to enable a service transmission path of the terminal device to be good.

SUMMARY

This application provides a communication method and apparatus to optimize a service transmission path of a terminal device.

According to a first aspect, this application provides a communication method. The method may include: a session management function network element sends first information to a first device, where the first information indicates to send destination IP address information of a first packet of a terminal device to the session management network element. The session management function network element receives the destination IP address information from the first device, and determines, based on the destination IP address information, a target local session anchor that serves the terminal device.

According to the foregoing method, the finally determined local session anchor can satisfy a requirement of the terminal device, so that EAS IP address information selected by the session management function network element is consistent with that selected by the terminal device, to optimize a user plane path.

In a possible design, the first information further indicates the first device to send the destination IP address information of the first packet to the session management network element after the first device determines that the destination IP address information satisfies a first condition. In this way, the first device can send an IP address of the first packet to the session management network element after determining that the condition is satisfied, to reduce signaling.

In a possible design, the first condition may be: the destination IP address information is different from first IP address information, where the first IP address information is IP address information that is of one edge application server EAS and that is determined by the session management function network element based on IP address information of N EASs that is obtained from an edge application server discovery function network element, and N is an integer greater than or equal to 2; or the destination IP address information does not belong to an IP address information set, where the IP address information set is IP address information of M edge application servers EASs that is determined by the session management function network element based on IP address information of N EASs that is obtained from an edge application server discovery function network element, the IP address information of the M EASs corresponds to a same data network access identifier DNAI, M is an integer greater than or equal to 2, and M is less than or equal to N. In this way, the first device can flexibly determine whether the destination IP address information satisfies the first condition.

In a possible design, a method for determining, by the session management function network element based on the destination IP address information, the target local session anchor may be: the session management network element determines a second local session anchor as the target local session anchor based on the destination IP address information, and deletes a first local session anchor, where the first local session anchor is inserted by the session management function network element based on a first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2; and the second local session anchor corresponds to the destination IP address information. In this way, the session management function network element can re-insert the local session anchor that is consistent with the destination IP address of the first packet of the terminal device.

In a possible design, the session management function network element receives the IP address information of the N edge application servers EASs from the edge application server discovery function network element, and determines, based on the IP address information of the N EASs, to insert the first device as a first traffic routing point, where N is an integer greater than or equal to 2. In this way, the first device can be subsequently indicated to monitor the first packet of the terminal device.

In a possible design, the session management function network element determines, based on the determined target local session anchor, whether to keep the first device as the first traffic routing point. In this way, whether the traffic routing point needs to be updated can be determined.

In a possible design, the first device is the first local session anchor, a first traffic routing point, or a session anchor PSA, where the first local session anchor and the first traffic routing point are inserted by the session management function network element based on the first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2.

In a possible design, the session management function network element receives second information from an edge application server discovery function network element, where the second information includes internet protocol IP address information of N edge application servers EASs. The session management function network element determines a plurality of data network access identifiers DNAIs corresponding to the IP address information of the N EASs, and inserts a plurality of local session anchors and at least one traffic routing point based on the plurality of DNAIs, where one DNAI corresponds to one local session anchor. The at least one traffic routing point includes the first device, and N is an integer greater than or equal to 2. In this way, one final local session anchor can be subsequently determined in the plurality of local session anchors based on a destination IP address of the first packet of the terminal device, to satisfy the requirement of the terminal device.

In a possible design, a method for determining, by the session management function network element based on the destination IP address information, the target local session anchor may be: the session management function network element determines a first DNAI corresponding to the destination IP address information; and determines that a local session anchor corresponding to the first DNAI is the target local session anchor, and deletes a local session anchor corresponding to a DNAI other than the first DNAI in the plurality of DNAIs. In this way, the local session anchor needed by the terminal device can be reserved to serve the terminal device.

In a possible design, when the plurality of local session anchors correspond to one traffic routing point, the first device is the traffic routing point.

In a possible design, when each of the plurality of local session anchors corresponds to one traffic routing point, the first device is a traffic routing point that is in a plurality of traffic routing points and that is closest to the terminal device.

In a possible design, the session management function network element deletes at least one to-be-deleted traffic routing point, where the at least one to-be-deleted traffic routing point corresponds to the DNAI other than the first DNAI in the plurality of DNAIs, and the first DNAI is a DNAI corresponding to the destination IP address information. In this way, when the plurality of traffic routing points are inserted, the traffic routing point that is not needed by the terminal device can be deleted.

According to a second aspect, this application provides a communication method. The method may include: a first device receives first information from a session management function network element, where the first information indicates to send, to the session management network element, destination IP address information of a first packet from a terminal device. The first device determines the destination IP address information of the first packet after detecting the first packet of the terminal device, and determines whether to send the destination IP address information to the session management function network element.

According to the foregoing method, a local session anchor finally determined by the session management function network element can satisfy a requirement of the terminal device, so that EAS IP address information selected by the session management function network element is consistent with that selected by the terminal device, to optimize a user plane path.

In a possible design, the first information further indicates the first device to send the destination IP address information of the first packet to the session management network element after the first device determines that the destination IP address information satisfies a first condition. In this way, the first device can send an IP address of the first packet to the session management network element after determining that the condition is satisfied, to reduce signaling.

In a possible design, a method for determining, by the first device, whether to send the destination IP address information to the session management function network element may be: the first device determines whether the destination IP address information satisfies the first condition. If the destination IP address information satisfies the first condition, the first device sends the destination IP address information to the session management function network element; or if the destination IP address does not satisfy the first condition, the first device skips sending the destination IP address information to the session management function network element. In this way, the first device can send the IP address of the first packet to the session management network element after determining that the condition is satisfied, to reduce the signaling.

In a possible design, the first condition may be: the destination IP address information is different from first IP address information, where the first IP address information is IP address information that is of one edge application server EAS and that is determined by the session management function network element based on IP address information of N EASs that is obtained from an edge application server discovery function network element, and N is an integer greater than or equal to 2; or the destination IP address information does not belong to an IP address information set, where the IP address information set is IP address information of M edge application servers EASs that is determined by the session management function network element based on IP address information of N EASs that is obtained from an edge application server discovery function network element, the IP address information of the M EASs corresponds to a same data network access identifier DNAI, M is an integer greater than or equal to 2, and M is less than or equal to N. In this way, the first device can flexibly determine whether the destination IP address information satisfies the first condition.

In a possible design, a method for determining, by the first device, whether to send the destination IP address information to the session management function network element may be: the first device sends the destination IP address information to the session management function network element. In this way, after detecting the first packet, the first device can send the destination IP address information of the first packet to the session management function network element, so that the session management function network element determines IP address information needed by the terminal device.

In a possible design, the first device is a first local session anchor, a first traffic routing point, or a session anchor PSA, where the first local session anchor and the first traffic routing point are inserted by the session management function network element based on a first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2.

In a possible design, the first device is one traffic routing point corresponding to a plurality of local session anchors, where the plurality of local session anchors are inserted by the session management function network element based on a plurality of DNAIs, the plurality of DNAIs are determined by the session management function network element based on internet protocol IP address information of N edge application servers EASs that is obtained from an edge application server discovery function network element, and N is an integer greater than or equal to 2.

In a possible design, the first device is a traffic routing point that is in a plurality of traffic routing points and that is closest to the terminal device, where the plurality of traffic routing points one-to-one correspond to a plurality of local session anchors, the plurality of local session anchors are inserted by the session management function network element based on a plurality of DNAIs, the plurality of DNAIs are determined by the session management function network element based on internet protocol IP address information of N edge application servers EASs that is obtained from an edge application server discovery function network element, and N is an integer greater than or equal to 2.

According to a third aspect, this application provides a communication method. The method may include: a terminal device receives third information from a session management function network element, where the third information includes internet protocol IP address information of N edge application servers EASs. The terminal device determines second IP address information in the IP address information of the N EASs. Then, the terminal device sends fourth information to the session management network element. The second IP address information corresponds to a second EAS, and the N EASs include the second EAS; the fourth information indicates the second EAS selected by the terminal device; and N is an integer greater than or equal to 2.

According to the foregoing method, the session management function network element can insert a traffic routing point and a local session anchor based on EAS IP address information selected by the terminal device, to satisfy a requirement of the terminal device. In addition, a problem that a location of the traffic routing point/the local anchor inserted by the session management function network element is inconsistent with an EAS IP selected by the terminal device is avoided, to optimize a user plane path.

In a possible design, the third information further includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N. In this way, the terminal device can determine whether the second IP address information belongs to the EAS IP address information set.

In a possible design, the IP address information of the N EASs includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N. In this way, the terminal device can determine whether the second IP address information belongs to the EAS IP address information set.

In a possible design, the terminal device determines whether the second IP address information belongs to the EAS IP address information set; and if the second IP address information does not belong to the EAS IP address information set, the terminal device includes the second IP address information in the fourth information, where if the second IP address information belongs to the EAS IP address information set, the fourth information does not include the second IP address information. In this way, the terminal device can enable the session management function network element to determine, depending on whether the fourth information includes the second IP address information, whether to need to update the local session anchor and the traffic routing point.

In a possible design, the fourth information includes the second IP address information. In this way, the session management function network element can determine IP address information needed by the terminal device, to determine the local session anchor that satisfies the requirement of the terminal device.

According to a fourth aspect, this application provides a communication method. The method may include: a session management function network element sends third information to a terminal device, receives fourth information from the terminal device, and determines IP address information of a target edge application server EAS based on the fourth information. Further, the session management function network element inserts a target traffic routing point based on the IP address information of the target EAS. The third information includes internet protocol IP address information of N EASs, and N is an integer greater than or equal to 2; and the fourth information indicates a second EAS selected by the terminal device, and the N EASs include the second EAS.

According to the foregoing method, the session management function network element can insert a traffic routing point and a local session anchor based on EAS IP address information selected by the terminal device, to satisfy a requirement of the terminal device. In addition, a problem that a location of the traffic routing point/the local anchor inserted by the session management function network element is inconsistent with an EAS IP selected by the terminal device is avoided, to optimize a user plane path.

In a possible design, the fourth information includes second IP address information, or the fourth information does not include second IP address information; and the second IP address information corresponds to the second EAS. Specifically, a method for determining, by the session management function network element, the IP address information of the target EAS based on the fourth information may be: when the fourth information includes the second IP address information, the session management function network element determines that the IP address information of the target EAS is the second IP address information; or when the fourth information does not include the second IP address information, the session management function network element determines that the IP address information of the target EAS is third IP address information, where the third IP address information is determined by the session management function network element in the IP address information of the N EASs, the third IP address information corresponds to a third EAS, and the N EASs include the third EAS. In this way, the session management function network element can accurately determine the IP address information of the target EAS depending on whether the fourth information includes the second IP address information.

In a possible design, the third information further includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N. In this way, the terminal device can determine whether the second IP address information belongs to the EAS IP address information set.

In a possible design, the IP address information of the N EASs includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N. In this way, the terminal device can determine whether the second IP address information belongs to the EAS IP address information set.

In a possible design, when the fourth information includes the second IP address information, the second IP address information does not belong to the EAS IP address information set; or when the fourth information does not include the second IP address information, the second IP address information belongs to the EAS IP address information set.

In a possible design, the session management function network element determines a DNAI corresponding to the third IP address information, and inserts a fourth traffic routing point based on the DNAI.

In a possible design, the session management function network element determines, in the IP address information of the N EASs, the IP address information of the M EASs that corresponds to the DNAI, to obtain the EAS IP address information set. In this way, the terminal device can subsequently determine whether the second IP address information belongs to the EAS IP address information set.

In a possible design, when the IP address information of the target EAS is the second IP address information, a method for inserting, by the session management function network element, the target traffic routing point based on the IP address information of the target EAS may be: the session management function network element updates the fourth traffic routing point to the target traffic routing point based on the IP address information of the target EAS. In this way, the session management function network element can insert the target traffic routing point that satisfies the requirement of the terminal device.

According to a fifth aspect, this application provides a communication method. The method may include: a session management function network element receives fifth information from an edge application server discovery function network element, where the fifth information includes internet protocol IP address information of N edge application servers EASs, and N is an integer greater than or equal to 2. The session management function network element determines an EAS IP address information set based on the IP address information of the N EASs, and sends the EAS IP address information set to the edge application server discovery function network element, where the EAS IP address information set includes IP address information of M EASs, the IP address information of the M EASs corresponds to a same data network access identifier DNAI, M is an integer greater than or equal to 2, and M is less than or equal to N.

According to the foregoing method, the session management function network element sends the EAS IP address information set to the edge application server discovery function network element, so that the edge application server discovery function network element subsequently sends the EAS IP address information set to a terminal device for selection by the terminal device. A problem that a location of a traffic routing point/a local anchor inserted by the session management function network element is inconsistent with an EAS IP selected by the terminal device is avoided, to optimize a service transmission path.

In a possible design, a method for determining, by the session management function network element, the EAS IP address information set based on the IP address information of the N EASs may be: the session management function network element selects fourth IP address information from the IP address information of the N EASs, and determines a DNAI corresponding to the fourth IP address information. Then, the session management function network element determines, in the IP address information of the N EASs, the IP address information of the M EASs that corresponds to the DNAI, to obtain the EAS IP address information set. The fourth IP address information corresponds to a fourth EAS, and the N EASs include the fourth EAS. In this way, the session management function network element can accurately obtain the EAS IP address information set.

According to a sixth aspect, this application provides a communication method. The method may include: after receiving an edge application server EAS IP address information set from a session management function network element, an edge application server discovery function network element sends sixth information to a terminal device, where the sixth information includes the EAS IP address information set, where the EAS IP address information set includes IP address information of M EASs, the IP address information of the M EASs corresponds to a same data network access identifier DNAI, and M is an integer greater than or equal to 2.

According to the foregoing method, the edge application server discovery function network element can send the EAS IP address information set to the terminal device for selection by the terminal device. A problem that a location of a traffic routing point/a local anchor inserted by the session management function network element is inconsistent with an EAS IP selected by the terminal device is avoided, to optimize a service transmission path.

According to a seventh aspect, this application provides a communication method. The method may include a terminal device receives sixth information from an edge application server discovery function network element, where the sixth information includes an edge application server EAS IP address information set; and determines IP address information of a target EAS based on the EAS IP address information set. The EAS IP address information set includes IP address information of M EASs, the IP address information of the M EASs corresponds to a same data network access identifier DNAI, and M is an integer greater than or equal to 2.

According to the foregoing method, a problem that a location of a traffic routing point/a local anchor inserted by a session management function network element is inconsistent with an EAS IP selected by the terminal device is avoided, to optimize a service transmission path.

According to an eighth aspect, this application further provides a communication apparatus. The communication apparatus may be a session management function network element. The communication apparatus is configured to implement functions of the session management function network element in the first aspect or the possible design examples of the first aspect, the fourth aspect or the possible design examples of the fourth aspect, or the fifth aspect or the possible design examples of the fifth aspect. The functions may be implemented by using hardware, or may be implemented by hardware executing corresponding software. The hardware or the software includes one or more modules corresponding to the foregoing functions.

In a possible design, a structure of the communication apparatus includes a transceiver unit and a processing unit. These units may perform the corresponding functions of the session management function network element in the first aspect or the possible design examples of the first aspect, the fourth aspect or the possible design examples of the fourth aspect, or the fifth aspect or the possible design examples of the fifth aspect. For details, refer to detailed descriptions in the method examples.

In a possible design, a structure of the communication apparatus includes a transceiver and a processor, and optionally, further includes a memory. The transceiver is configured to send and receive information or data and is configured to communicate and interact with another device in a communication system. The processor is configured to support the communication apparatus in performing the corresponding functions of the session management function network element in the first aspect or the possible design examples of the first aspect, the fourth aspect or the possible design examples of the fourth aspect, or the fifth aspect or the possible design examples of the fifth aspect. The memory is coupled to the processor, and stores program instructions and data that are necessary for the communication apparatus.

According to a ninth aspect, this application further provides a communication apparatus. The communication apparatus may be a first device. The communication apparatus is configured to implement functions of the first device in the second aspect or the possible design examples of the second aspect. The functions may be implemented by using hardware, or may be implemented by hardware executing corresponding software. The hardware or the software includes one or more modules corresponding to the foregoing functions.

In a possible design, a structure of the communication apparatus includes a transceiver unit and a processing unit. These units may perform the corresponding functions of the first device in the second aspect or the possible design examples of the second aspect. For details, refer to detailed descriptions in the method examples.

In a possible design, a structure of the communication apparatus includes a transceiver and a processor, and optionally, further includes a memory. The transceiver is configured to send and receive information or data, and communicate and interact with another device in a communication system. The processor is configured to support the communication apparatus in performing the corresponding functions of the first device in the second aspect or the possible design examples of the second aspect. The memory is coupled to the processor, and stores program instructions and data that are necessary for the communication apparatus.

According to a tenth aspect, this application further provides a communication apparatus. The communication apparatus may be a terminal device. The communication apparatus is configured to implement functions of the terminal device in the third aspect or the possible design examples of the third aspect, or the seventh aspect. The functions may be implemented by using hardware, or may be implemented by hardware executing corresponding software. The hardware or the software includes one or more modules corresponding to the foregoing functions.

In a possible design, a structure of the communication apparatus includes a transceiver unit and a processing unit. These units may perform corresponding functions of the terminal device in the third aspect or the possible design examples of the third aspect, or the seventh aspect. For details, refer to detailed descriptions in the method examples.

In a possible design, a structure of the communication apparatus includes a transceiver and a processor, and optionally, further includes a memory. The transceiver is configured to send and receive information or data, and communicate and interact with another device in a communication system. The processor is configured to support the communication apparatus in performing the corresponding functions of the terminal device in the third aspect or the possible design examples of the third aspect, or the seventh aspect. The memory is coupled to the processor, and stores program instructions and data that are necessary for the communication apparatus.

According to an eleventh aspect, this application further provides a communication apparatus. The communication apparatus may be an edge application server discovery function network element. The communication apparatus is configured to implement functions of the edge application server discovery function network element in the sixth aspect. The functions may be implemented by using hardware, or may be implemented by hardware executing corresponding software. The hardware or the software includes one or more modules corresponding to the foregoing functions.

In a possible design, a structure of the communication apparatus includes a transceiver unit and a processing unit. These units may perform the corresponding functions of the edge application server discovery function network element in the sixth aspect. For details, refer to detailed descriptions in the method examples.

In a possible design, a structure of the communication apparatus includes a transceiver and a processor, and optionally, further includes a memory. The transceiver is configured to send and receive information or data, and communicate and interact with another device in a communication system. The processor is configured to support the communication apparatus in performing the corresponding functions of the edge application server discovery function network element in the sixth aspect. The memory is coupled to the processor, and stores program instructions and data that are necessary for the communication apparatus.

According to a twelfth aspect, an embodiment of this application provides a communication system. The communication system may include the foregoing mentioned session management function network element, first device, terminal device, edge application server discovery function network element, and the like.

According to a thirteenth aspect, an embodiment of this application provides a computer-readable storage medium. The computer-readable storage medium stores program instructions. When the program instructions are run on a computer, the computer is enabled to perform the method in any possible design in the first aspect, the second aspect, the third aspect, the fourth aspect, the fifth aspect, the sixth aspect, or the seventh aspect. For example, the computer-readable storage medium may be any usable medium that can be accessed by the computer. By way of example but not limitation, the computer-readable medium may include a non-transitory computer-readable medium, a random access memory (RAM), a read-only memory (ROM), an electrically erasable programmable read-only memory (EEPROM), a CD-ROM or other optical disk storage, a magnetic disk storage medium or another magnetic storage device, or any other medium that can be for carrying or storing desired program code in a form of instructions or a data structure and that can be accessed by the computer.

According to a fourteenth aspect, an embodiment of this application provides a computer program product including computer program code or instructions. When the computer program product runs on a computer, the computer is enabled to implement the method in any possible design in the first aspect, the second aspect, the third aspect, the fourth aspect, the fifth aspect, the sixth aspect, or the seventh aspect.

According to a fifteenth aspect, this application further provides a chip, including a processor and a communication interface. The processor is coupled to a memory, and is configured to read and execute a program instruction stored in the memory, so that the chip implements the method in any possible design in the first aspect, the second aspect, the third aspect, the fourth aspect, the fifth aspect, the sixth aspect, or the seventh aspect.

For each of the eighth aspect to the fifteenth aspect and technical effects that may be achieved in each aspect, refer to the descriptions of the technical effects that can be achieved in possible solutions in the first aspect, the second aspect, the third aspect, the fourth aspect, the fifth aspect, the sixth aspect, or the seventh aspect.

DESCRIPTION OF EMBODIMENTS

The following further describes this application in detail with reference to the accompanying drawings.

Embodiments of this application provide a communication method and apparatus, to optimize a service transmission path of a terminal device. The method and the apparatus in this application are based on a same technical concept. Because problem-resolving principles of the method and the apparatus are similar, mutual reference may be made to implementation of the apparatus and the method.

In the descriptions of this application, terms such as "first" and "second" are only for distinction and description, but cannot be understood as indicating or implying relative importance, or as indicating or implying a sequence. For example, in this application, the "second" may first appear, and then the "first" appears. This is not limited in this application.

In the descriptions of this application. "at least one" means one or more, and "a plurality of" means two or more. "At least one of the following" or a similar expression thereof indicates any combination of these items, including a single item or any combination of a plurality of items. For example, at least one of a, b, or c may represent: a, b, c, a and b, a and c, b and c, or a, b, and c, where a, b, and c may be singular or plural.

It should be noted that, in the descriptions of this application, XX information may be understood as an XX message, or may be understood as an XX information element. This is not limited in this application.

To describe the technical solutions in embodiments of this application more clearly, the following describes the communication method and apparatus according to embodiments of this application in detail with reference to the accompanying drawings.

Figure 1:
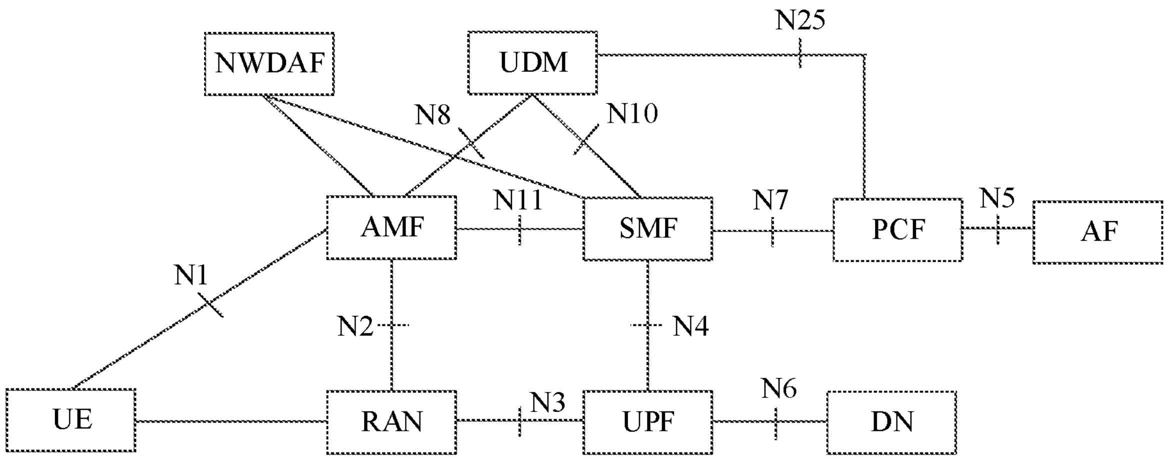
FIG. 1 is a schematic diagram of an architecture of a communication system according to this application.

FIG. 1 is a schematic diagram of an architecture of a possible communication system to which a communication method is applicable according to this application. The architecture of the communication system includes a radio access network (RAN) node (or device), an access and mobility management function (AMF) network element, a session management function (SMF) network element, a user plane (UPF) network element, a policy control function (PCF) network element, a unified data management (UDM) network element, an application function (AF) network element, a network data analytics function (NWDAF) network element, a terminal device, and a data network (DN). The network elements or the devices may be connected to each other through an interface. An interface name shown in FIG. 1 is merely an example for description. This is not specifically limited in embodiments of this application. Functions of some network elements or devices in the communication system are described in detail below.

The terminal device may also be referred to as user equipment (UE), a mobile station (MS), a mobile terminal (MT), or the like, and is a device that provides voice and/or data connectivity for a user. For example, the terminal device may include a handheld device that has a wireless connection function, a vehicle-mounted device, and the like. Currently, the terminal device may be a mobile phone, a tablet, a notebook computer, a palmtop computer, a mobile internet device (MID), a wearable device, a virtual reality (VR) device, an augmented reality (AR) device, a wireless terminal in industrial control, a wireless terminal in autonomous driving, a wireless terminal in self-driving, a wireless terminal in remote medical surgery, a wireless terminal in a smart grid (smart grid), a wireless terminal in transportation safety, a wireless terminal in a smart city, a wireless terminal in smart furniture, a wireless terminal in smart office, a wireless terminal in smart wearables, a wireless terminal in smart transportation, a wireless terminal in a smart home, or the like. A specific technology and a specific device form that are used for the terminal device are not limited in embodiments of this application. In FIG. 1, the terminal device is shown by using the UE. This is merely used as an example, and does not constitute a limitation on the terminal device.

The RAN node (or device) is a device that provides a wireless access service for the terminal device and enables the terminal device to access a wireless network. Currently, some examples of the RAN node are a base station, a transmission reception point (TRP), an evolved NodeB (eNB), a next generation NodeB (gNB), a radio network controller (RNC), a NodeB (NB), a base station controller BSC), a base transceiver station (BTS), a home base station (for example, a home evolved NodeB or a home NodeB, HNB), a base band unit (BBU), or a wireless fidelity (Wi-Fi) access point (AP). The RAN node may alternatively be a module or unit that completes some functions of the base station, for example, may be a central unit (CU), or may be a distributed unit (DU). The CU herein completes functions of a radio resource control protocol and a packet data convergence protocol (PDCP) of the base station, and may further complete functions of a service data adaptation protocol (SDAP). The DU completes functions of a radio link control layer and a medium access control (MAC) layer of the base station, and may further complete functions of a part or all of a physical layer. For specific descriptions of the foregoing protocol layers, refer to technical specifications related to the 3rd generation partnership project (3GPP).

The DN may be an internet, an IP multimedia service (IMS) network, an area network (namely, a local network, for example, a mobile edge computing (MEC network), or the like. The DN is a destination that a protocol data unit (PDU) session of the terminal device accesses. The data network includes an application server, and the application server provides a service for the terminal device by performing data transmission with the terminal device.

A core network is for enabling the terminal device to access a DN that can implement a service of the terminal device. Functions of network elements in the core network are described below.

The AMF may be configured to manage access control and mobility of the terminal device, and may be specifically responsible for registration of the terminal device, mobility management, network registration of the terminal device, a tracking area update procedure, reachability detection, session management function network element selection, mobility state transition management, and the like.

The SMF may be configured to be responsible for session management (including session creation, modification, and release) of the terminal device, user plane function network element selection and reselection, IP address assignment of the terminal device, quality of service (QOS) control, and the like.

The PCF may be responsible for policy management of the terminal device, including both a mobility-related policy and a PDU session-related policy, for example, a QoS policy and a charging policy.

The UPF may be responsible for processing a packet of the terminal device, for example, forwarding and charging of user data.

The UDM stores subscription data of the terminal device, registration information related to the terminal device, and the like.

A main function of the AF is interaction with a 3GPP core network to provide a service, for example, affect service flow routing, access network capability exposure and policy control.

The NWDAF may be configured to perform data analytics, for example, analyze a background traffic transmission data analytics result of the terminal device.

Each of the foregoing network elements in the core network may also be referred to as a functional entity, and may be a network element implemented on dedicated hardware, or may be a software instance running on dedicated hardware, or an instance of a virtualization function on an appropriate platform. For example, the virtualization platform may be a cloud platform.

It should be noted that the architecture of the communication system shown in FIG. 1 is not limited to including only the network elements shown in the figure, and may further include another device not shown in the figure.

It should be noted that a distribution form of the network elements in the core network is not limited in embodiments of this application. The distribution form shown in FIG. 1 is merely an example, and is not a limitation on this application.

For ease of description, in this application, the network elements shown in FIG. 1 are used as an example for description subsequently, and an XX network element is directly referred to as an XX for short. For example, the UPF network element is referred to as the UPF for short. It should be understood that names of all network elements in this application are merely used as examples. In future communication, for example, 6G, there may be other names. Alternatively, in future communication, for example, 6G, the network elements in this application may be replaced with other entities, devices, or the like that have same functions. This is not limited in this application. For example, there may alternatively be other names of the network elements shown in FIG. 1. Unified descriptions are provided herein.

It should be noted that the communication system shown in FIG. 1 is a 5th generation (5G) network architecture, and does not constitute a limitation on a 5G network. Optionally, the method in embodiments of this application is further applicable to various future communication systems, for example, 6G or another communication network.

Figure 2:
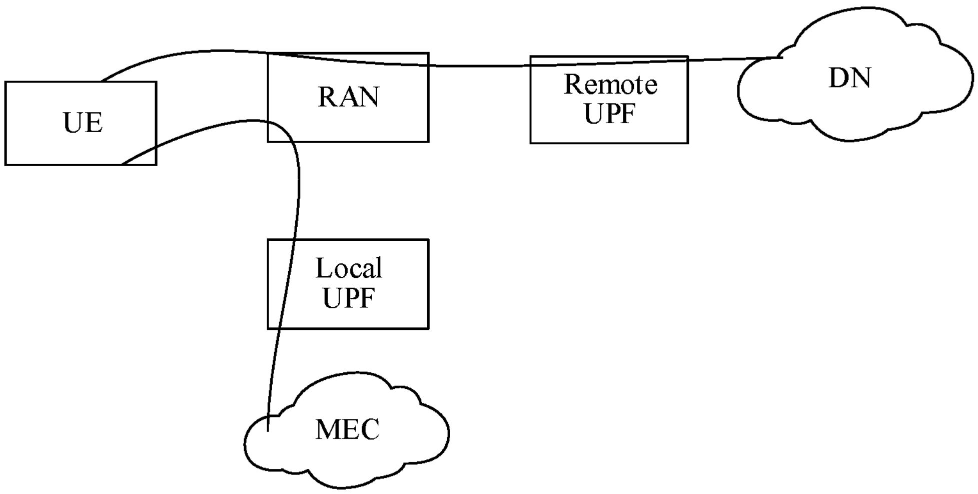
FIG. 2 is a schematic diagram of a MEC scenario according to this application.

Based on the architecture shown in FIG. 1. 5G further supports insertion of at least one session anchor (PDU session anchor, PSA) on a user plane path of one PDU session, to support a connection to a local DN, so that UE can access an application server in the local DN nearby. For example, in a MEC scenario, a local UPF may be deployed on a path connecting to a MEC network, and a remote (R) UPF may be deployed on a path to another DN network, where the remote UPF may also be referred to as a remote PSA, for example, as shown in a schematic diagram of a MEC scenario shown in FIG. 2. The local UPF may be inserted into a session path as a local (L) PSA. That is, the local UPF in FIG. 2 is an L-PSA. It can be learned from FIG. 2 that, compared with the path for the UE to access the DN, the path for the UE to access the MEC network is clearly shortened. Specifically, when a local session anchor is deployed, a corresponding traffic routing point such as an uplink classifier (ULCL)/a branching point (BP) may also be deployed. The ULCL/the BP distributes an uplink data packet received from the UE to the PSA, namely, the L-PSA or the R-PSA, according to a distribution rule, and sends a data packet received from the PSA to the UE. It should be noted that the ULCL/the BP may be integrated with the PSA, or may exist independently of the PSA. This is not limited in this application.

MEC may be implemented by using a DNS technology. Specifically, an EASDF network element is introduced in a 5G network architecture to implement at least one of the following functions: receiving, by the EASDF, a DNS message processing rule sent by a session management function network element, sending a DNS message to a DNS server, and adding an extension mechanisms for DNS client subnet ((extension mechanisms for DNS, EDNS) client subnet, ECS) option, which is referred to as an ECS option for short below, to a DNS query message. The ECS option is an extension item in the DNS message, and is for representing location information of the UE. For example, the ECS option may be represented by using address information of a UPF, or may be represented by using an IP address information range that can be accessed by the UE at a current location. The ECS option is added to the DNS query message, so that the DNS server can return an EAS IP address that matches the ECS option. Further, the EASDF network element can return the EAS IP to the session management function network element, so that the session management function network element determines a location of the traffic routing point based on the EAS IP and EAS deployment information, and inserts the traffic routing point and the local session anchor for the terminal device at the location. In this way, the terminal device can access a corresponding EAS nearby. The EAS deployment information is information about an application server deployed on a MEC platform. The MEC platform may be represented by using a DNAI. The information about the application server may be represented by using a fully qualified domain name (FQDN). IP address information, and the like. The location of the traffic routing point may be represented by using a DNAI.

Figure 3:
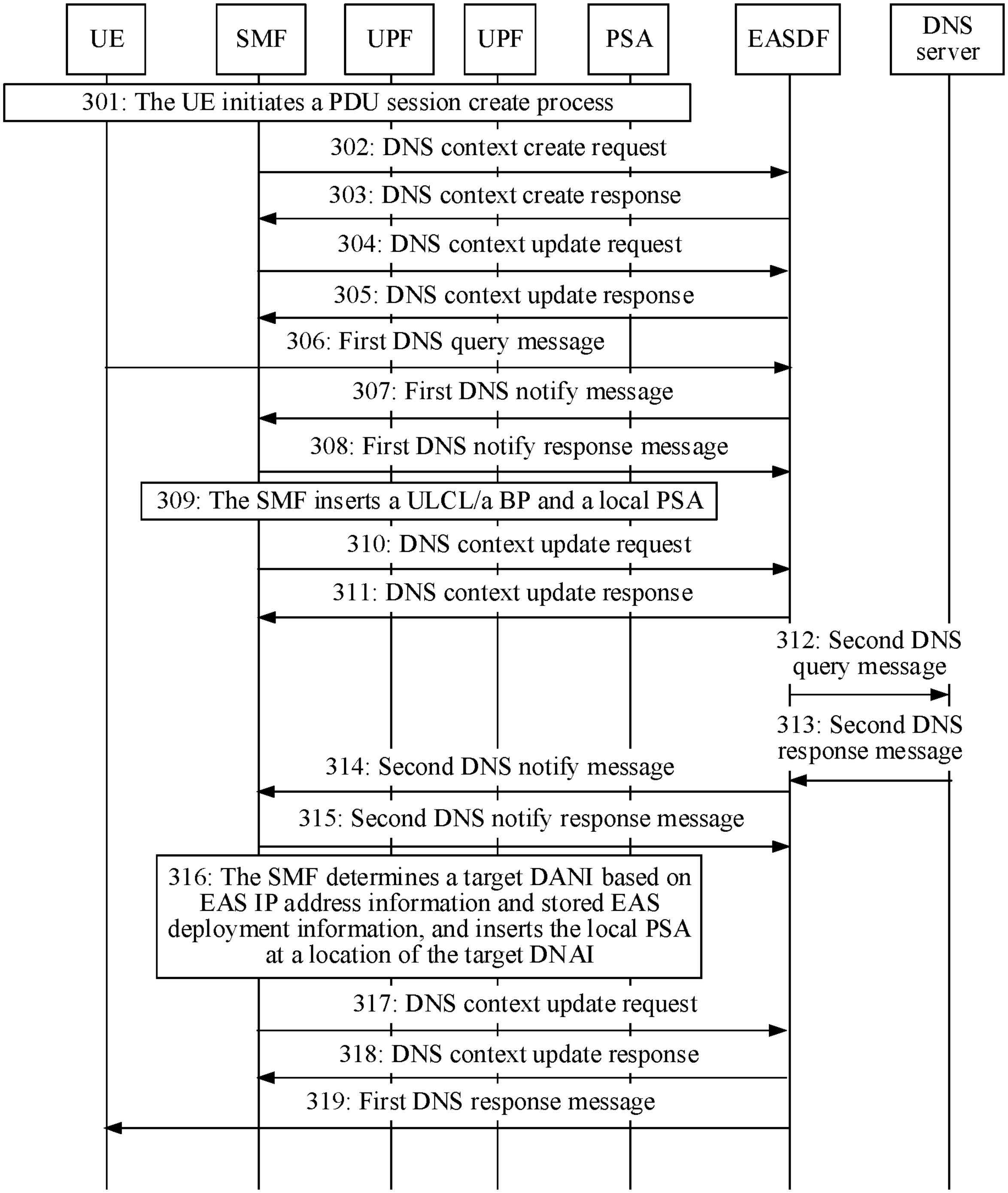
FIG. 3 is a schematic flowchart of accessing MEC.

Currently, when the terminal device accesses the MEC, that is, when the terminal device starts an application, a procedure for implementing nearby access to the MEC may be shown in FIG. 3, and may specifically include the following steps.

It should be noted that this application relates to interaction that is between an EASDF and an SMF and that is after the EASDF receives a DNS query message, and specifically, to further processing on the DNS query message, for example, adding an ECS option or forwarding the DNS query message to a local DNS server. However, this application is not limited to this solution. Alternatively, an EASDF may further process a received DNS query message based on the DNS query message and information that is obtained by the EASDF. The information obtained by the EASDF may be obtained by the EASDF from an SMF before the EASDF receives the DNS query message. For example, the information obtained by the EASDF may be a correspondence between an FQDN, an ECS option, and a DNAI. For example, the information obtained by the EASDF may alternatively be an FQDN and an EAS IP range (range). This is not limited in this application.

Step 301: UE initiates a PDU session create process.

Specifically, in the PDU session create process, an SMF selects an EASDF, and sends address information of the EASDF to the UE, and the SMF selects a session anchor PSA.

Step 302: The SMF sends a DNS context create request to the EASDF.

The DNS context create request may be an Neasdf_DNS_Context Create Request.

For example, the DNS context create request may include at least one of IP address information of the UE, a data network name (DNN), a callback signal uniform resource identifier, and a DNS processing rule. For example, the DNS processing rule may include at least one of a fully qualified domain name range (FQDN range) and an IP address range (IP range).

Step 303: The EASDF sends a DNS context create response to the SMF.

The DNS context create response may be an Neasdf_DNS_Context Create Response.

For example, the DNS context create response may include a context identifier (Identity, ID) of the EASDF.

A DNS context on the EASDF may be created through the interaction between the SMF and the EASDF in step 302 and step 303.

Step 304: The SMF sends a DNS context update request to the EASDF.

The DNS context update request may be an Neasdf_DNS_Context Update Request.

Step 305: The EASDF sends a DNS context update response to the SMF.

The DNS context create response may be an Neasdf_DNS_Context Update Response.

The DNS context on the EASDF may be updated through the interaction between the SMF and the EASDF in step 304 and step 305.

It should be noted that step 304 and step 305 are optional steps, and there may further be other operations between step 304 and step 302, as shown in subsequent steps.

Step 306: The UE sends a first DNS query message to the EASDF, to initiate a DNS query procedure.

Specifically, the first DNS query message may be sent to the EASDF via a RAN and a UPF.

The first DNS query message may include an application (APP) fully qualified domain name (FQDN).

Step 307: The EASDF sends a first DNS notify message to the SMF, where the first DNS notify message includes the APP FQDN.

Specifically, the EASDF sends the first DNS notify message to the SMF based on the DNS context in step 302 to step 305. For example, if the APP FQDN carried in the first DNS query message is in an FQDN range in the DNS context in step 302 to step 305, the EASDF sends the first DNS notify message to the SMF.

For example, the first DNS notify message may be an Neasdf_DNS_Context Notify Request.

Step 308: The SMF sends a first DNS notify response message to the EASDF.

For example, the first DNS notify response message may be an Neasdf_DNS_Context Notify Response.

Specifically, the SMF determines, based on the APP FQDN and EAS deployment information on the SMF, information for constructing an ECS option or an address of a local DNS server, and sends the information about the ECS option or the address of the local DNS server to the EASDF by using the first DNS notify response message.

When the EAS deployment information is a correspondence between the FQDN. IP address information of an application server, and a data network access identifier (DNAI), the SMF determines, based on the EAS deployment information and UPF deployment information, the information for constructing the ECS option. When the EAS deployment information is a correspondence between the FQDN, the address of the local DNS server, and a DNAI, the SMF determines the address of the local DNS server. The EAS deployment information represents information about an application server deployed on a MEC platform corresponding to the DNAI, and the information about the application server includes at least one of application fully qualified domain name information and IP address information of the application server.

For example, the UPF deployment information is a correspondence between the information for constructing the ECS option and the DNAI. For example, the information for constructing the ECS option is address information of a UPF or an IP address information range that can be accessed by the UE at a current location. Step 309: The SMF inserts a ULCL/a BP and a local PSA (namely, a local UPF PSA, referred to as the local PSA, L-PSA for short below) based on the information in step 307.

The local PSA and the ULCL/the BP may be integrated or separated.

It should be noted that step 309 is an optional step.

It should be noted that functions of step 309 and step 316 below are both inserting the local PSA. In other words, the step of inserting the local PSA is not limited, and the insertion operation may occur after step 308 or step 314.

Step 310: The SMF sends a DNS context update request to the EASDF.

The DNS context update request may be an Neasdf_DNS_Context Update Request.

Step 311: The EASDF sends a DNS context update response to the SMF.

The DNS context create response may be an Neasdf_DNS_Context Update Response.

The DNS context on the EASDF may be updated through the interaction between the SMF and the EASDF in step 310 and step 311.

It should be noted that step 310 and step 311 are optional steps.

Step 312: The EASDF sends a second DNS query message to a DNS server.

Optionally, the second DNS query message includes the ECS option.

Optionally, step 312 may be that the EASDF sends the second DNS query message to the local DNS server.

Step 313: The EASDF receives a second DNS response message sent by the DNS server, where the second DNS response message includes EAS IP address information.

Step 314: The EASDF sends a second DNS notify message to the SMF, where the second DNS notify message includes the EAS IP address information.

For example, the second DNS notify message may be an Neasdf_DNS_Context Notify Request.

Step 315: The SMF sends a second DNS notify response message to the EASDF.

Step 316: The SMF determines a target DANI based on the EAS IP address information and the stored EAS deployment information, and inserts the local PSA at a location of the target DNAI.

It should be noted that step 316 is an optional step. Optionally, step 316 may be performed before step 315. This is not limited in this application.

Step 317: The SMF sends a DNS context update request to the EASDF.

The DNS context update request may be an Neasdf_DNS_Context Update Request.

Step 318: The EASDF sends a DNS context update response to the SMF.

The DNS context create response may be an Neasdf_DNS_Context Update Response.

A DNS context on the EASDF may be updated through the interaction between the SMF and the EASDF in step 317 and step 318.

For example, in step 317, the SMF may indicate the EASDF to send the second DNS response message in step 313 to the UE.

It should be noted that step 317 and step 318 are optional.

Step 319: The EASDF sends a first DNS response message to the UE, where the second DNS response message includes EAS IP address information.

Optionally, the first DNS response message may be the same as the second DNS response message in step 313.

Currently, in the foregoing procedure, a case in which the EAS IP address information included in the first DNS response message is a plurality of pieces of EAS IP address information is not considered. However, when the first DNS response message includes the plurality of pieces of EAS IP address information, if the plurality of pieces of EAS IP address information correspond to different DNAIs, which piece of EAS IP address information should be specifically selected by the SMF to determine the target DNAI to insert a local session anchor and a traffic routing point so that there is a possibility of better matching a DNAI corresponding to EAS IP address information selected by the UE is a problem that needs to be urgently resolved. Currently, there has been no implementation method for determining a location of a service traffic routing point to enable a service transmission path of the terminal device to be good.

Based on this, embodiments of this application provide a communication method, so that a problem that a location of a traffic routing point/a local session anchor inserted by a session management function network element is inconsistent with an EAS IP selected by a terminal device can be avoided, to optimize a service transmission path of the terminal device. The following describes in detail, by using specific embodiments, the communication method provided in embodiments of this application.

It should be noted that, in the following embodiments, when an XX network element or device is an execution body to perform an operation, it may be understood as that the XX network element or device performs the operation, or may be understood as that a processor, a chip, a functional module, or the like in the XX network element or device performs the operation. For example, an operation performed by a terminal device may be understood as being performed by the terminal device, or may be understood as being performed by a processor, a chip, or a functional module in the terminal device.

Figure 4:
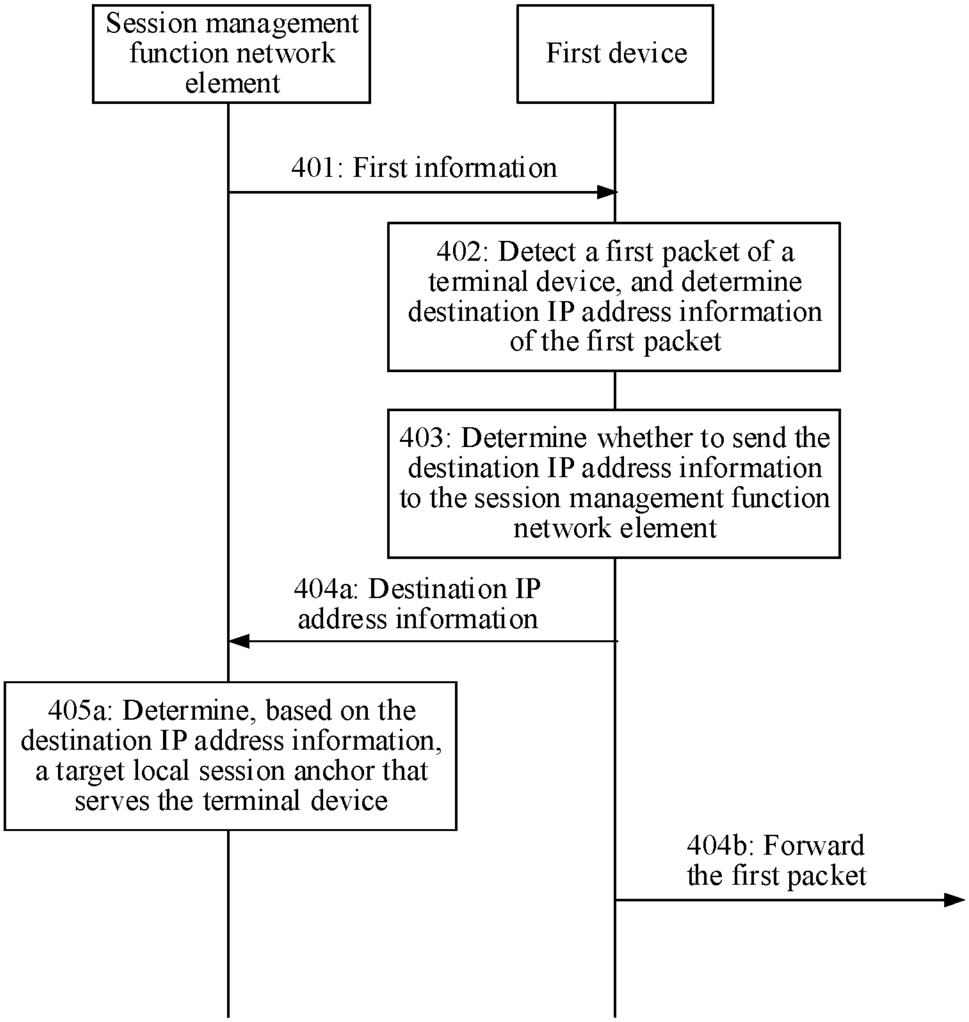
FIG. 4 is a flowchart of a communication method according to this application.

Based on the foregoing descriptions, FIG. 4 shows a communication method according to an embodiment of this application. A specific procedure of the method may include the following steps.

Step 401: A session management function network element sends first information to a first device, where the first information indicates the first device to send destination IP address information of a first packet of a terminal device to the session management network element. That is, the first device receives the first information from the session management function network element, where the first information indicates the first device to send, to the session management network element, the destination IP address information of the first packet from the terminal device.

Optionally, in different scenarios, there may be the following four cases of the first device.

Case a1: The first device may be a first local session anchor (a first L-PSA) or a first traffic routing point (a first ULCL/BP).

In the case a1, after receiving IP address information of N edge application servers EASs from an edge application server discovery function network element, the session management function network element determines, based on IP address information of one EAS in the IP address information of the N EASs, to insert the first L-PSA and the first ULCL/BP, where N is an integer greater than or equal to 2, and the first L-PSA and the ULCL/the BP may be separated or integrated. That is, the session management network element determines to insert the first device as the first traffic routing point or the first local session anchor.

For example, the session management function network element may determine the IP address information of the N edge application servers EASs in second information received from the edge application server discovery function network element.

A method for determining, by the session management function network element based on the IP address information of the N EASs, to insert the first L-PSA and the first ULCL/BP may be:

The session management function network element determines first IP address information in the IP address information of the N EASs, determines a DNAI corresponding to the first IP address information, and inserts the first L-PSA and the first ULCL/BP based on the DNAI corresponding to the first IP address information.

Optionally, the session management function network element may determine the first IP address information based on information such as a local configuration policy, a policy from a policy control function network element, location information of the terminal device, and analytics data from a network data analytics network element.

Optionally, a method for determining, by the session management function network element, the DNAI corresponding to the first IP address information may be: the session management function network element determines, based on the first IP address information and EAS deployment information, the DNAI corresponding to the first IP address information.

Case a2: The first device may be a session anchor (PSA) (namely, a remote session anchor).

Optionally, in the case a2, after receiving IP address information of N edge application servers EASs from an edge application server discovery function network element, the session management network element may also first insert a first L-PSA and a first ULCL/BP. For an insertion method, refer to related descriptions in the case a1.

Certainly, in the case a2, after receiving IP address information of N edge application servers EASs from an edge application server discovery function network element, the session management network element may not insert a first L-PSA and a first ULCL/BP, that is, may not first perform an operation of inserting a local session anchor and a traffic routing point. This is not limited in this application.

Case a3: The first device is a second ULCL/BP.

Case a4: The first device is a third ULCL/BP.

Specifically, in the case a3 and the case a4, after receiving second information (the second information includes IP address information of N edge application servers EASs) from an edge application server discovery function network element, the session management function network element determines a plurality of DNAIs corresponding to the IP address information of the N EASs. Then, the session management function network element inserts a plurality of local session anchors and at least one traffic routing point based on the plurality of DNAIs, where one DNAI corresponds to one local session anchor, and the at least one traffic routing point includes the first device.

For example, if the session management function network element determines that the IP address information of the N EASs corresponds to a DNAI 1, a DNAI 2, and a DNAI 3, the session management function network element inserts an L-PSA 1 based on the DNAI 1, inserts an L-PSA 2 based on the DNAI 2, and inserts an L-PSA 3 based on the DNAI 3.

In the foregoing case a3, the plurality of local session anchors correspond to one traffic routing point, and the session management function network element inserts the second ULCL/BP as the traffic routing point corresponding to the plurality of local session anchors. The foregoing example is still used. That is, when inserting the L-PSA 1 to the L-PSA 3, the session management network element further inserts the second ULCL/BP corresponding to all of the L-PSA 1 to the L-PSA 3.

In the foregoing case a4, each of the plurality of local session anchors corresponds to one traffic routing point. That is, the session management network element inserts a plurality of traffic routing points that one-to-one correspond to the plurality of local session anchors. In this case, the session management function network element determines, as the first device, a traffic routing point, namely, the third ULCL/BP, that is in the plurality of traffic routing points and that is closest to the terminal device.

Optionally, the traffic routing point closest to the terminal device may alternatively be described as a traffic routing point directly connected to a RAN node.

Optionally, when the session management network element inserts the plurality of traffic routing points, the plurality of inserted traffic routing points may be connected in a cascading manner.

Optionally, when the session management function network element inserts the plurality of traffic routing points, and the plurality of traffic routing points are connected in a parallel manner, the first device may be an access network device connected to the plurality of traffic routing points.

Optionally, the first packet may be the $1^{st}$ packet of the first terminal device. The first packet may be an uplink packet, or may be a downlink packet. This is not limited in this application.

In an optional implementation, in the foregoing case a1 and case a2, the first information may further indicate the first device to send the destination IP address information of the first packet to the session management network element after the first device determines that the destination IP address information satisfies a first condition. For example, there may be the following two cases of the first condition.

Case b1: The destination IP address information is different from the first IP address information.

Case b2: The destination IP address information does not belong to an IP address information set, where the IP address information set is IP address information of M edge application servers EASs that is determined by the session management function network element based on the IP address information of the N EASs that is obtained from the edge application server discovery function network element, the IP address information of the M EASs corresponds to a same DNAI, M is an integer greater than or equal to 2, and M is less than or equal to N.

In the case b2, the session management function network element determines the EAS IP address information set based on the IP address information of the N EASs. Specifically, the session management function network element selects the first IP address information from the IP address information of the N EASs, and the session management function network element determines the DNAI corresponding to the first IP address information. Then, the session management function network element determines, in the IP address information of the NEASs, the IP address information of the M EASs that corresponds to the DNAI, to obtain the EAS IP address information set.

Optionally, the session management function network element determines the EAS IP address information set in the IP address information of the N EASs based on location information of the terminal device, a local configuration policy, a policy from the policy control function network element, analytics data from the network data analytics network element, and the like.

Certainly, it should be understood that in the foregoing case a1 and case a2, if there is no limitation of the first condition, the first device may send the destination IP address information of the first packet to the session management function network element after detecting the first packet.

In the foregoing case a3 and case a4, the first information may indicate the first device to send the destination IP address information of the first packet to the session management function network element after the first device detects the first packet.

Step 402: The first device detects the first packet of the terminal device, and determines destination IP address information of the first packet.

Step 403: The first device determines whether to send the destination IP address information to the session management function network element.

In a possible example, after detecting the first packet, the first device sends the destination IP address information to the session management function network element.

In another possible example, in the foregoing case a1 and case a2, when the first condition exists, a method for determining, by the first device, whether to send the destination IP address information to the session management function network element may be: if the destination IP address information satisfies the first condition, the first device sends the destination IP address information to the session management function network element. If the destination IP address does not satisfy the first condition, the first device skips sending the destination IP address information to the session management function network element. In this case, the first device continues to forward the first packet, for example, to a remote anchor.

When the first device determines to send the destination IP address information to the session management function network element, procedures of step 404*a* and step 405*a* below are performed. When the first device determines not to send the destination IP address information to the session management function network element, step 404*b* below is performed.

Step 404*a*: The first device sends the destination IP address information to the session management network element. That is, the session management function network element receives the destination IP address information from the first device.

Step 405*a*: The session management function network element determines, based on the destination IP address information, a target local session anchor that serves the terminal device.

Optionally, the session management function network element determines, based on the destination IP address information and the EAS deployment information, the target local session anchor that serves the terminal device. The EAS deployment information is information about an application server on a MEC platform. The MEC platform may be represented by using DNAI, and the information about the application server may be represented by using IP address information of the application server. In other words, the EAS deployment information refers to a correspondence between the DNAI and the information about the application server.

It should be noted that the descriptions of step 405*a* may alternatively be replaced with descriptions "the session management function network element determines, based on the destination IP address information, a target DNAI or a target traffic routing point that serves the terminal device".

In an optional implementation, in the foregoing case a1 and case a2, when the session management function network element first inserts the first local session anchor, a method for determining, by the session management function network element, the target local session anchor based on the destination IP address information may be: the session management network element determines a second local session anchor as the target local session anchor based on the destination IP address information, where the second local session anchor corresponds to the destination IP address information. Specifically, the session management function network element determines, based on the destination IP address information, the target DNAI corresponding to the destination IP address information, and inserts the target local session anchor (namely, the second local session anchor) based on the target DNAI. Optionally, the session management function network element deletes the first local session anchor.

In a possible example, in the foregoing case a1 and case a2, when the session management function network element first inserts the first local session anchor, and the first device reports the destination IP address information after detecting the first packet, if the session management network element determines that the target local session anchor corresponding to the destination IP address information is the first local session anchor, the session management function network element directly determines that the first local session anchor is the target local session anchor, that is, keeps the first local session anchor as the target local session anchor.

Optionally, when the first device is the first traffic routing point, the session management function network element determines, based on the determined target local session anchor, whether to keep the first device as the first traffic routing point.

In an optional implementation, in the foregoing case a2, when the session management function network element does not insert the first local session anchor, a method for determining, by the session management function network element, the target local session anchor based on the destination IP address information may be: the session management network element determines, based on the destination IP address information, the target DNAI corresponding to the destination IP address information, and inserts the target local session anchor based on the target DNAI.

In an optional implementation, in the foregoing case a3 and case a4, a method for determining, by the session management function network element, the target local session anchor based on the destination IP address information may be: the session management function network element determines a first DNAI (namely, the target DNAI) corresponding to the destination IP address information. The session management function network element determines that a local session anchor corresponding to the first DNAI is the target local session anchor. Optionally, the session management function network element deletes a local session anchor corresponding to a DNAI other than the first DNAI in the plurality of DNAIs. For example, the session management function network element determines that a traffic routing point corresponding to the first DNAI is the target traffic routing point. Optionally, the session management function network element deletes a traffic routing point corresponding to the DNAI other than the first DNAI in the plurality of DNAIs.

For example, in the foregoing case a4, the session management function network element deletes at least one to-be-deleted traffic routing point. The at least one to-be-deleted traffic routing point corresponds to the DNAI other than the first DNAI in the plurality of DNAIs. Alternatively, it may be understood as that the at least one to-be-deleted traffic routing point corresponds to a local session anchor other than the target local session anchor in the plurality of local session anchors.

Step 404*b*: The first device continues to forward the first packet, for example, to the remote session anchor or a data network.

In other words, the first local session anchor (namely, the first L-PSA) inserted by the session management function network element is the target local session anchor that serves the terminal device.

According to the communication method provided in this embodiment of this application, the finally determined local session anchor can satisfy a requirement of the terminal device, so that EAS IP address information selected by the session management function network element is consistent with that selected by the terminal device, to ensure an optimal user plane path.

Based on the foregoing descriptions, the following describes in detail, by using specific examples shown in FIG. 5 to FIG. 8B, the communication method provided in the embodiment shown in FIG. 4. In the following examples shown in FIG. 5 to FIG. 8B, descriptions are provided by using an example in which a terminal device is UE, an edge application server discovery function network element is an EASDF, a session management function network element is an SMF, a local session anchor is an L-PSA, and a traffic routing point is a ULCL/a BP.

It should be noted that the traffic routing point in this application may be the ULCL or the BP. In this application, only an example in which the traffic routing point is the ULCL is used for description. In addition, the traffic routing point and the L-PSA may be integrated or separated. In addition, a process in this application is also applicable to an uplink packet and a downlink packet. In this application, only the uplink packet is used as an example for description.

Figure 5:
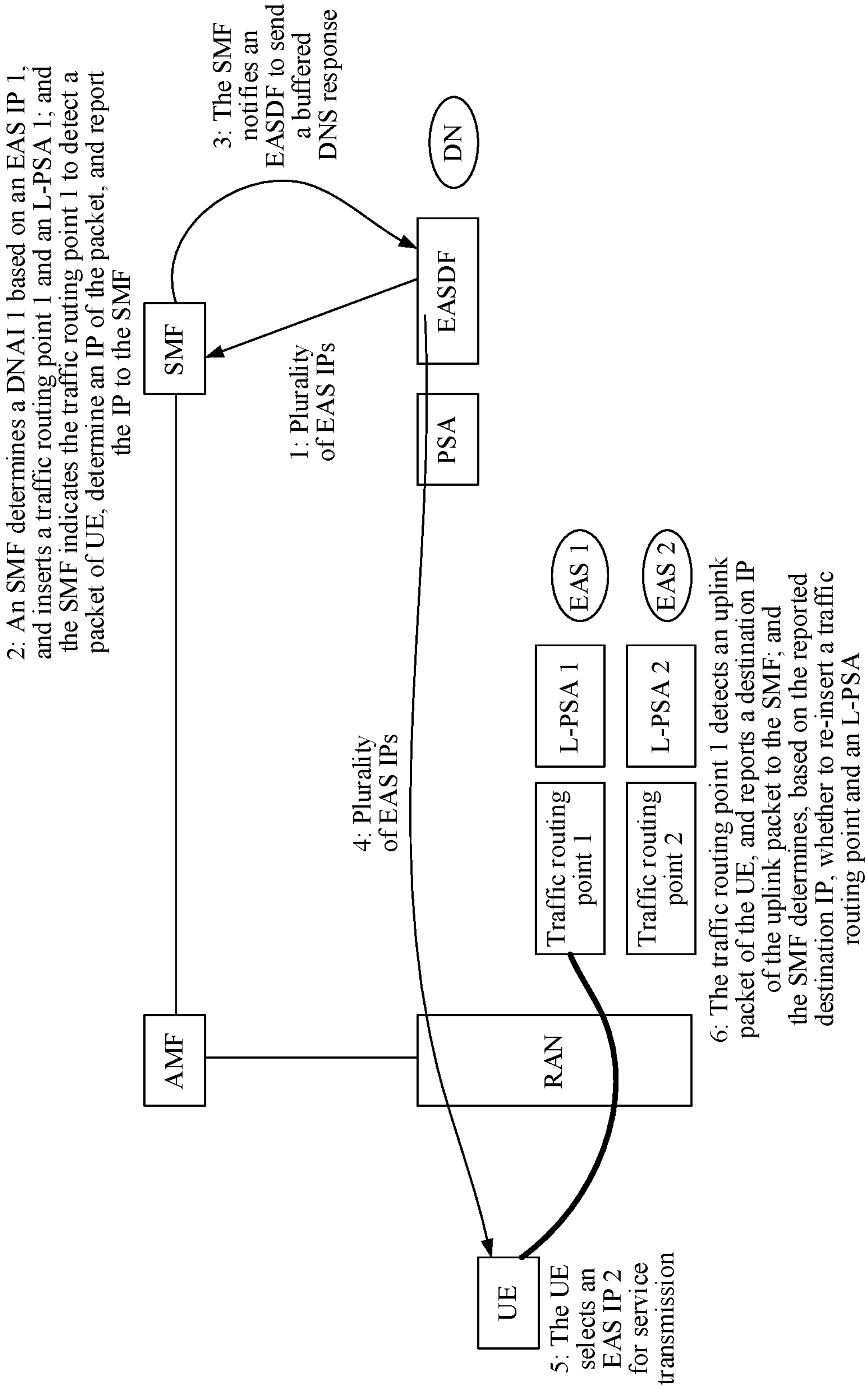
FIG. 5 is a schematic diagram of a scenario according to this application.

FIG. 5 is a schematic diagram of an example scenario. In this scenario, when receiving a plurality of EAS IPs (for example, including an EAS IP 1, EAS IP 2, EAS IP 3, EAS IP 4, and an EAS IP 5) reported by an EASDF, an SMF selects an EAS IP (namely. EAS IP address information), and inserts a traffic routing point/an L-PSA. Then, the SMF indicates the traffic routing point to detect an uplink or downlink packet of UE to determine a destination/source IP, namely, an EAS IP selected by the UE, corresponding to the packet and report the EAS IP to the SMF, so that the SMF re-inserts a traffic routing point/an L-PSA. Specifically, the SMF receives the plurality of EAS IPs from the EASDF, and the SMF selects the EAS IP (for example, the EAS IP 1), determines a corresponding DNAI 1 based on the selected EAS IP 1, and inserts an L-PSA 1 and a traffic routing point 1. A packet transmission path is shown by a thick solid line in FIG. 5. The SMF determines, based on the EAS IP reported by the traffic routing point, whether to re-insert the traffic routing point and the L-PSA.

For example, the plurality of EAS IPs reported by the EASDF include the EAS IP 1, the EAS IP 2, the EAS IP 3, the EAS IP 4, and the EAS IP 5. The SMF selects the EAS IP 1, and determines, based on EAS deployment information (that is, a correspondence between an EAS IP and a DNAI), that the EAS IP 1 corresponds to the DNAI 1. Then, the SMF inserts the traffic routing point 1 and the L-PSA 1 based on the DNAI 1. In a process of inserting the traffic routing point 1, the SMF sends a packet processing rule to the traffic routing point 1, to indicate the traffic routing point 1 to report the destination IP, namely, the EAS IP, of the uplink packet to the SMF when the traffic routing point 1 detects the uplink packet of the UE. The SMF determines, based on the reported EAS IP, whether to re-insert the traffic routing point and the L-PSA. When the reported EAS IP is the EAS IP 2, the SMF determines, based on the EAS IP 2 and the EAS deployment information, that the EAS IP 2 corresponds to a DNAI 2. Then, the SMF inserts a traffic routing point 2 and an L-PSA 2 based on the DNAI 2. The traffic routing point 1 and the traffic routing point 2 may be the same, or may be different.

Figure 6A:
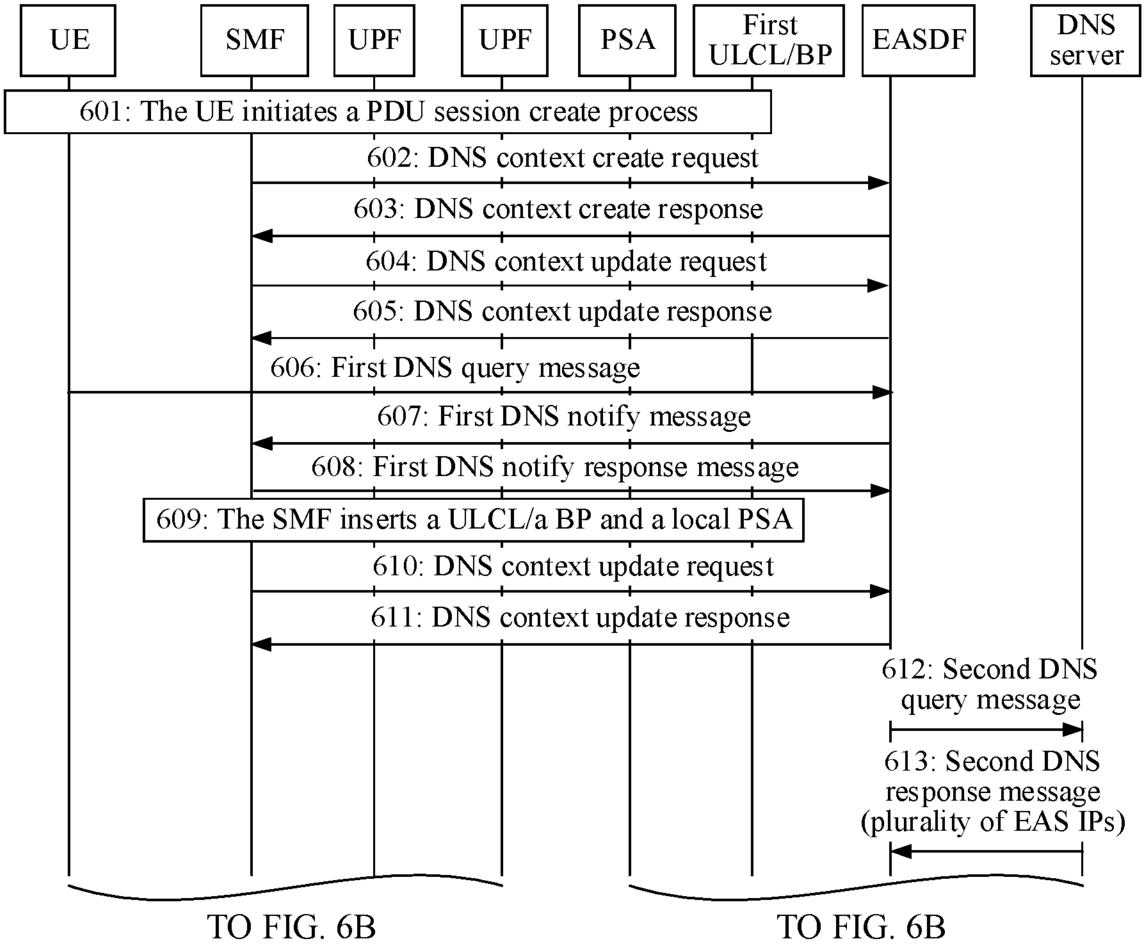
FIG. 6A and FIG. 6B are a flowchart of an example of a communication method according to this application.
Figure 6B:
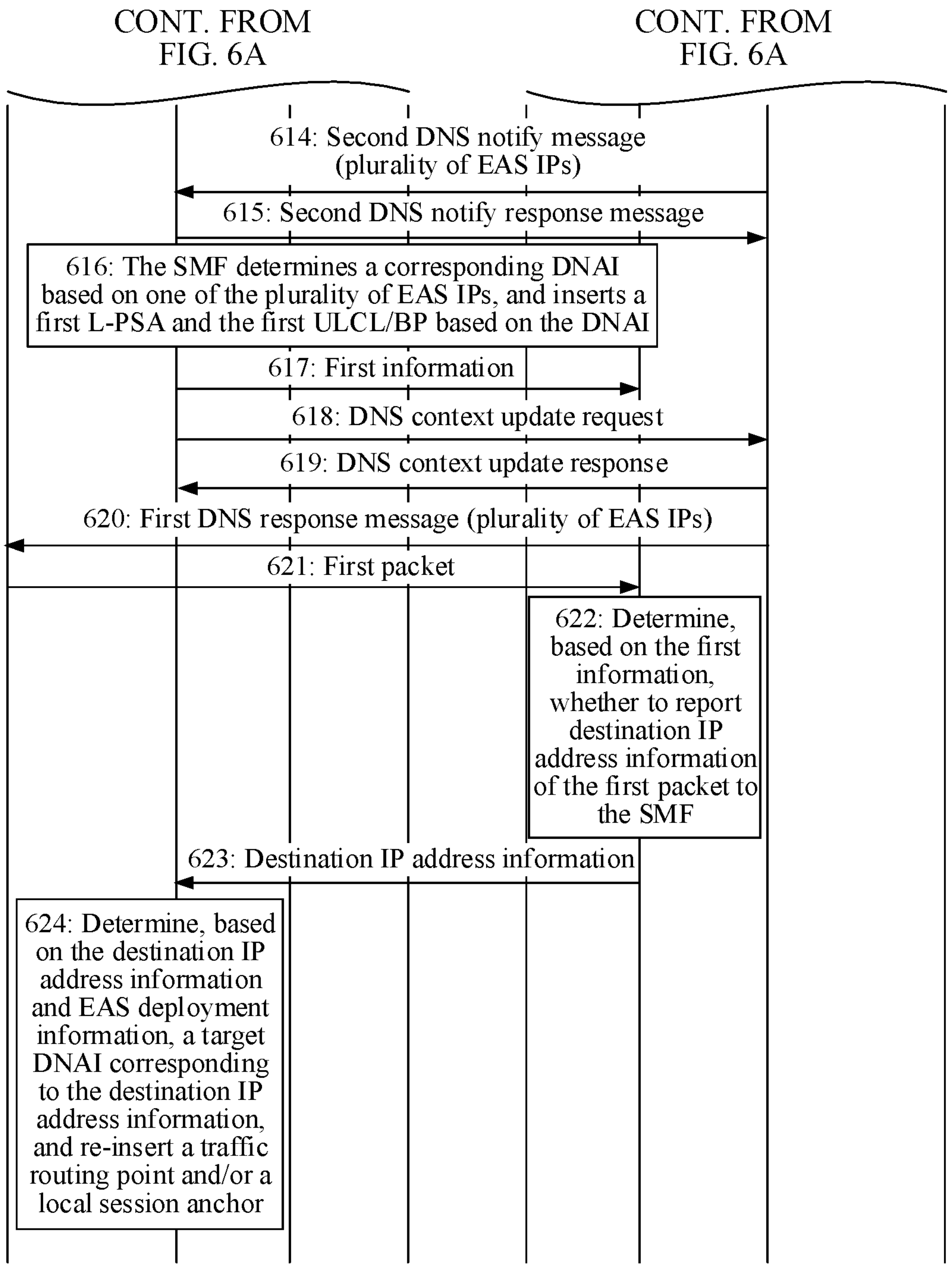

Based on the scenario shown in FIG. 5, FIG. 6A and FIG. 6B show an example of a communication method. For example, a procedure of the example may include the following steps.

Step 601 to step 615 are similar to step 301 to step 315. For specific content, refer to descriptions in step 301 to step 315.

It should be noted that a second DNS response message sent by a DNS server to an EASDF in step 613 includes a plurality of pieces of EAS IP address information (referred to as a plurality of EAS IPs below); and a second DNS notify message sent by the EASDF to an SMF in step 614 includes the plurality of pieces of EAS IP address information (referred to as the plurality of EAS IPs below), and the plurality of EAS IPs correspond to different DNAIs.

Step 616: The SMF determines a corresponding DNAI based on one of the plurality of EAS IPs, and inserts a first L-PSA and a first ULCL/BP based on the DNAI.

For example, an EAS IP 1 is used as an example for description of the one of the plurality of EAS IPs, and the EAS IP 1 is also the first IP address information in the embodiment shown in FIG. 4.

Optionally, the SMF determines the EAS IP 1 based on one or more of UE IP address information, a local policy, a policy from the PCF, analytics data from an NWDAF, and the like.

Optionally, the SMF determines, based on the EAS IP 1 and EAS deployment information (including a correspondence between the EAS IPs and the DNAIs), a DNAI corresponding to the EAS IP 1. The SMF selects the first ULCL/BP and the first L-PSA based on the DNAI.

Step 617: The SMF sends first information to the first ULCL/BP, where the first information indicates the ULCL/the BP to detect a first packet of UE and send destination IP address information of the first packet to the SMF.

The SMF may send the first information to the ULCL/the BP by using an N4 session create request. The destination IP address information is an EAS IP.

It should be noted that an example in which the first packet is an uplink packet is used for description in this embodiment. It may be understood that this embodiment may further be applicable to a downlink packet. For the downlink packet, the first ULCL/BP sends source IP address information of the first packet to the SMF.

Optionally, the first packet is the $1^{st}$ uplink packet of the UE. In this case, the first information indicates the first ULCL/BP to send the destination IP address information of the first packet to the SMF when the first ULCL/BP detects the $1^{st}$ uplink packet of the UE.

Optionally, the first information indicates the first ULCL/BP to report the destination IP address information to the SMF when the first ULCL/BP detects that the destination IP address information of the first packet is not the EAS IP 1.

Optionally, the first information indicates to report the destination IP address information to the SMF when it is detected that the destination IP address information of the first packet is not in an EAS IP list. The EAS IP list, namely, the IP address information set in the embodiment shown in FIG. 4, corresponds to a same DNAI. Specifically, refer to related content of the first condition in the embodiment shown in FIG. 4.

It should be noted that the foregoing describes, by using only a manner in which a traffic routing point is inserted as an example, how to implement access to an edge computing platform. In addition, in this application, the edge computing platform may be further accessed by creating a local session. In this case, the first information is sent to the first L-PSA, and the first L-PSA performs packet detection. The SMF determines, based on destination IP address information reported by the first L-PSA, whether to change the L-PSA.

Step 618 to step 620 are similar to step 317 to step 319. For specific content, refer to descriptions in step 317 to step 319.

It should be noted that a first DNS response message sent by the EASDF to the SMF in step 620 includes a plurality of EAS IPs, and the plurality of EAS IPs correspond to different DNAIs.

Step 621: The UE sends the first packet.

For example, the destination IP address information of the first packet is an EAS IP 2.

Specifically, the UE selects the EAS IP 2 from the plurality of EAS IPs included in the first DNS response message sent by the EASDF, and sends the first packet based on the EAS IP 2.

It should be noted that, in a possible example, after receiving the plurality of EAS IPs in step 620, the UE may first attempt to select an EAS IP. For example, the UE sequentially attempts at the EAS IP in a sequence from front to back. When the $1^{st}$ EAS IP cannot be connected, the UE attempts at the $2^{nd}$ EAS IP.

Optionally, the UE may select the EAS IP 2 from the plurality of received EAS IPs based on a local configuration, address affinity, and the like.

In this scenario, the first information may indicate the ULCL/the BP or the L-PSA to detect a change of the EAS IP of the packet of the UE and report a changed EAS IP to the SMF when the EAS IP changes. In this case, when the ULCL/the BP or the L-PSA detects the $1^{st}$ packet of the UE, it may be considered that the $1^{st}$ change occurs, and then the ULCL/the BP or the L-PSA reports the IP address information of the $1^{st}$ packet to the SMF.

Step 622: After the first ULCL/BP or the first L-PSA receives the first packet of the UE, the first ULCL/BP or the first L-PSA determines, based on the first information, whether to report the destination IP address information of the first packet to the SMF.

For example, when a reporting condition is satisfied, the first ULCL/BP or the first L-PSA reports the destination IP address information to the SMF.

The reporting condition may be: the $1^{st}$ packet of the UE, the destination IP address information of the $1^{st}$ packet of the UE is not the EAS IP 1, or the destination IP address information of the $1^{st}$ packet of the UE is not in the EAS IP list.

For another example, when a reporting condition is not satisfied, the first ULCL/BP or the L-PSA continues to forward the first packet, for example, to a remote PSA or a data network.

Step 623: The first ULCL/BP or the first L-PSA sends the destination IP address information to the SMF.

Specifically, the first ULCL/BP or the first L-PSA may send the destination IP address information to the SMF by using an N4 session report.

Step 624: The SMF determines, based on the destination IP address information and the EAS deployment information, whether to re-insert a traffic routing point and/or a local session anchor.

Alternatively, step 624 may be understood as that the SMF determines, based on the destination IP address information and the EAS deployment information, a target DNAI corresponding to the destination IP address information, and re-inserts the traffic routing point and/or the local session anchor.

When determining that a local session anchor corresponding to the destination IP address information of the first packet of the UE is different from a local session anchor inserted by the SMF, the SMF determines to re-insert the local session anchor. Otherwise, the local session anchor inserted by the SMF remains unchanged, that is, the session anchor is not re-inserted. Whether the traffic routing point is re-inserted is similar thereto.

For example, the SMF inserts the first ULCL/BP and the first L-PSA based on a DNAI 1. When the SMF determines the DNAI 1 based on the reported EAS IP 2, the SMF does not need to re-insert the traffic routing point and the local session anchor. When the SMF determines a DNAI 2 based on the reported EAS IP 2, the SMF needs to update the traffic routing point and the local session anchor based on the DNAI 2.

According to the foregoing example, optimization of a user plane path can be ensured, and a problem that the path is not good because EAS IPs on which the UE and the SMF are based are inconsistent is avoided.

Figure 7:
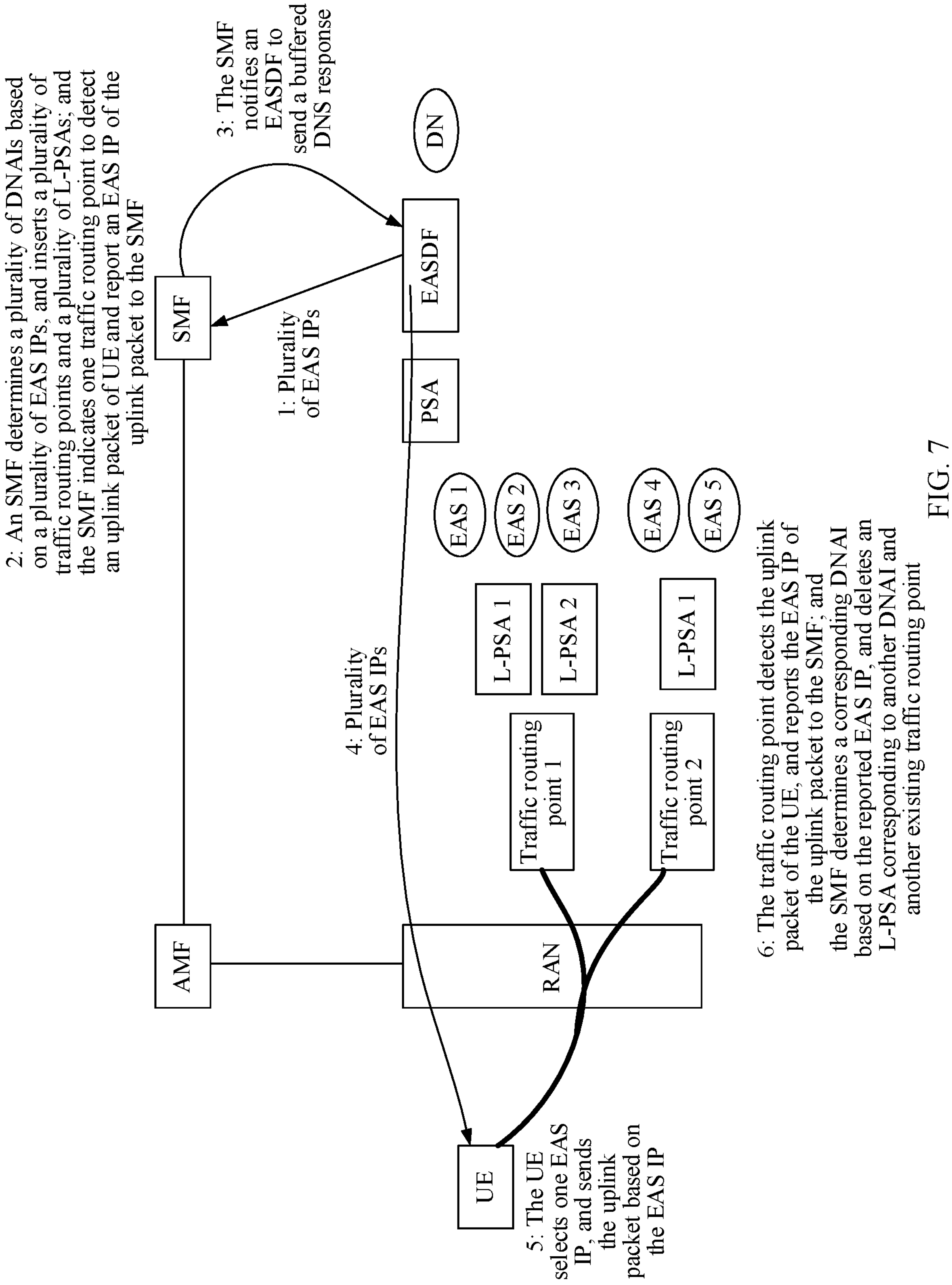
FIG. 7 is a schematic diagram of another scenario according to this application.

FIG. 7 is a schematic diagram of another example scenario. In this scenario, an SMF determines a plurality of target DNAIs based on a plurality of EAS IPs received from an EASDF, and inserts a plurality of traffic routing points and a plurality of local session anchors. The SMF indicates a traffic routing point ULCL/BP to detect an uplink packet of UE and report an EAS IP of the uplink packet to the SMF. The SMF determines a final target DNAI based on the reported EAS IP, deletes an L-PSA corresponding to another DNAI, and optionally, deletes another ULCL/BP (when the plurality of traffic routing points are inserted).

For example, the SMF receives the plurality of EAS IPs (including an EAS IP 1, an EAS IP 2, an EAS IP 3, an EAS IP 4, and an EAS IP 5) from the EASDF, the SMF determines the plurality of corresponding DNAIs (including a DNAI 1 and a DNAI 2) based on the plurality of EAS IPs, and the SMF inserts a traffic routing point 1, an L-PSA 1, an L-PSA 2, a traffic routing point 2, and an L-PSA 3 based on the plurality of DNAIs. The traffic routing point 1 routes traffic of packets that access the EAS IP 1 and the EAS IP 2 to the L-PSA 1, the traffic routing point 1 routes traffic of a packet of the EAS IP 3 to the L-PSA 2, and the traffic routing point 2 routes traffic of packets of the EAS IP 4 and the EAS IP 5 to the L-PSA 2. A packet transmission path is shown by thick solid lines in FIG. 7.

It may be understood that the process described in the foregoing example is also applicable to a downlink packet, and descriptions are provided only by using the uplink packet as an example in this embodiment.

Figure 8A:
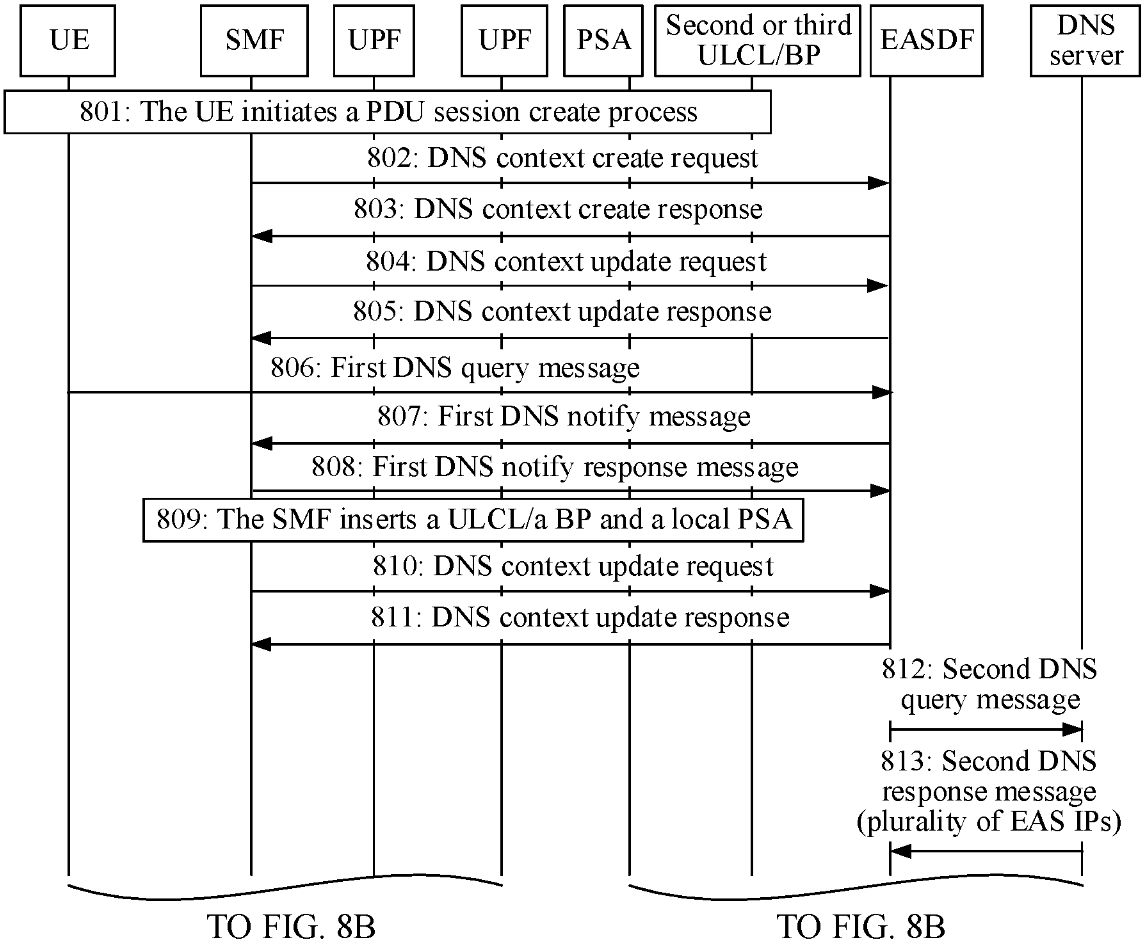
FIG. 8A and FIG. 8B are a flowchart of an example of another communication method according to this application.
Figure 8B:
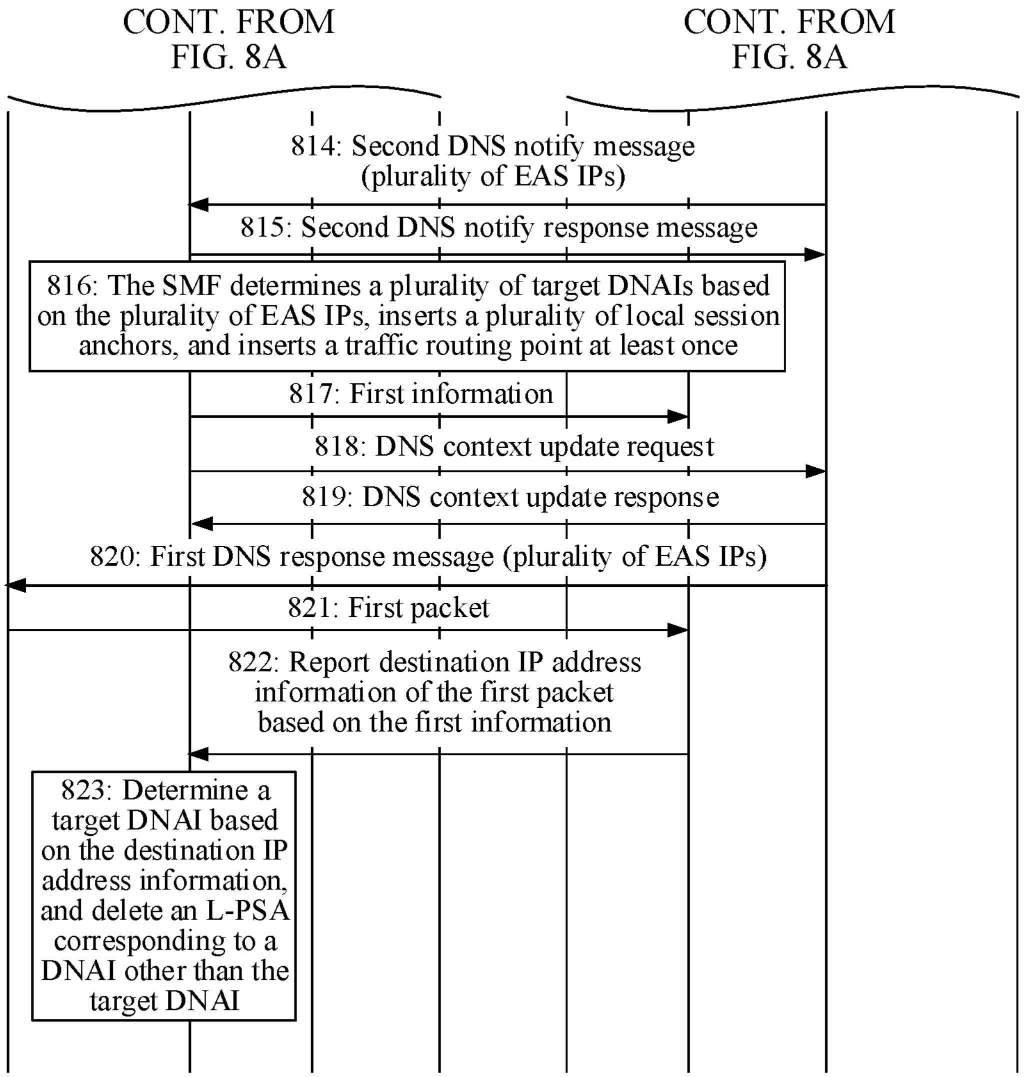

Based on the scenario shown in FIG. 7, FIG. 8A and FIG. 8B show an example of a communication method. For example, a procedure of the example may include the following steps.

Step 801 to step 815 are similar to step 301 to step 315. For specific content, refer to descriptions in step 301 to step 315.

It should be noted that a second DNS response message sent by an EASDF to an SMF in step 813 includes a plurality of pieces of EAS IP address information (referred to as a plurality of EAS IPs below); and a second DNS notify message sent by the EASDF to an SMF in step 814 includes the plurality of pieces of EAS IP address information (referred to as the plurality of EAS IPs below), and the plurality of EAS IPs correspond to different DNAIs.

Step 816: The SMF determines a plurality of target DNAIs based on the plurality of EAS IPs.

When the SMF determines the plurality of target DNAIs, the SMF inserts local session anchors a plurality of times. Optionally, the SMF may insert at least one traffic routing point, namely, at least one ULCL/BP, that is, insert the traffic routing point at least once.

For example, if the SMF determines a target DNAI 1, a target DNAI 2, and a target DNAI 3, the SMF inserts an L-PSA 1 into the target DNAI 1, inserts an L-PSA 2 into the target DNAI 2, and inserts an L-PSA 3 into the target DNAI 3. One case 1 is that L-PSA 1 to L-PSA 3 correspond to a same traffic routing point; and the other case 2 is that L-PSA 1 to L-PSA 3 correspond to different traffic routing points, that is, the SMF separately inserts three traffic routing points.

Step 817: The SMF sends first information to a second ULCL/BP or a third ULCL/BP, where the first information indicates the traffic routing point to detect a first packet of UE and send destination IP address information of the first packet to the SMF.

The first packet may be the $1^{st}$ uplink packet of the UE.

In the case 1 in step 816, that is, when the L-PSA 1 to the L-PSA 3 correspond to the same traffic routing point, the second ULCL/BP refers to the same traffic routing point corresponding to the local session anchors. In the case 2 in step 816, that is, when the L-PSA 1 to the L-PSA 3 correspond to the different traffic routing points, the third ULCL/BP refers to a traffic routing point closest to the UE.

Step 818 to step 820 are similar to step 317 to step 319. For specific content, refer to descriptions in step 317 to step 319.

It should be noted that a first DNS response message sent by the EASDF to the UE in step 820 includes a plurality of EAS IPs, and the plurality of EAS IPs correspond to different DNAIs.

Step 821: The UE sends the first packet.

For example, the destination IP address information of the first packet is an EAS IP 2.

Specifically, the UE selects the EAS IP 2 from the plurality of EAS IPs included in the first DNS response message sent by the EASDF, and sends the first packet based on the EAS IP 2.

Step 822: After receiving the first packet of the UE, the second ULCL/BP or the third ULCL/BP reports the destination IP address information of the first packet to the SMF based on the first information.

Specifically, the second ULCL/BP or the third ULCL/BP may send the destination IP address information to the SMF by using an N4 session report.

It should be noted that the second ULCL/BP or the third ULCL/BP continues, according to a forwarding rule, to send the first packet, for example, to the L-PSA or an R-PSA.

Step 823: The SMF determines a target DNAI based on the destination IP address information, and deletes an L-PSA corresponding to a DNAI other than the target DNAI.

For example, if the SMF determines the target DNAI 2 based on the EAS IP 2, the SMF deletes the L-PSA 1 and the L-PSA 3 that correspond to the target DNAI 1 and the target DNAI 3.

Further, in the foregoing case 1 in which the L-PSA 1 to the L-PSA 3 correspond to the same traffic routing point, the SMF only needs to delete the L-PSA 1 and the L-PSA 3.

In the case 2 in which the L-PSA 1 to the L-PSA 3 correspond to the different traffic routing points, the SMF further needs to delete corresponding traffic routing points, for example, a traffic routing point 2 and a traffic routing point 3, and update a user plane path.

According to the foregoing example, that a user plane path is good can be ensured, and a problem that the path is not good because EAS IPs on which the UE and the SMF are based are inconsistent is avoided. Compared with the example shown in FIG. 6A and FIG. 6B, impact on the UE may also be avoided, and filtering performed by the SMF on the plurality of EAS IPs is avoided.

Figure 9:
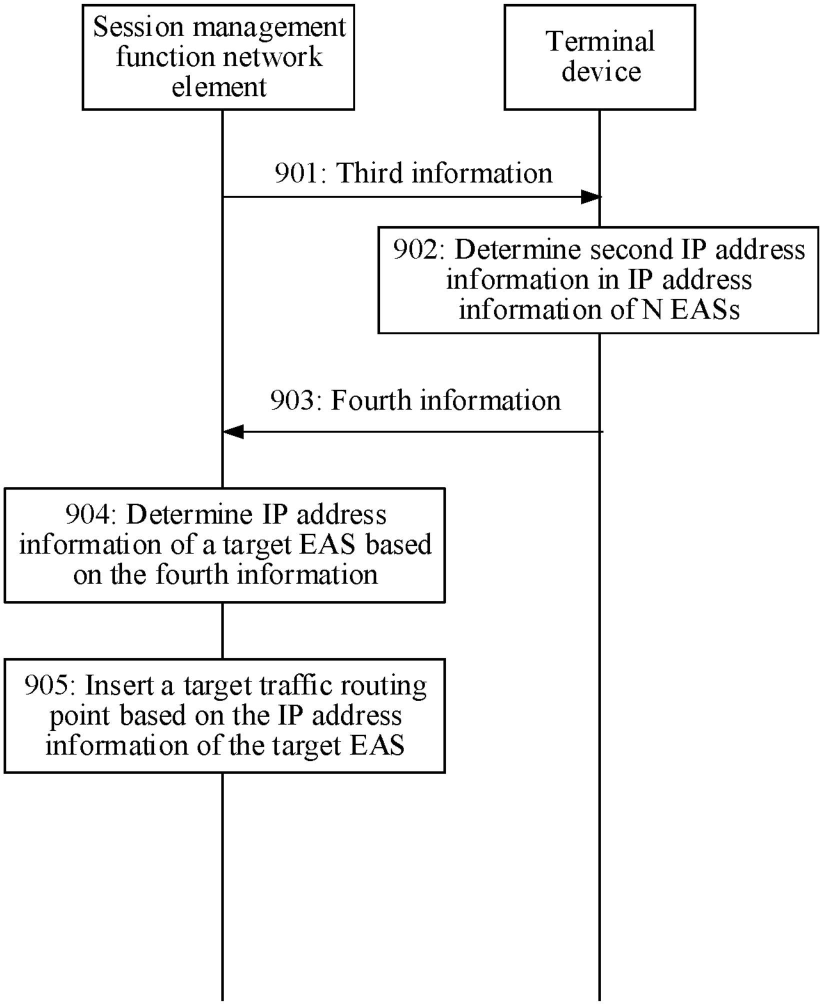
FIG. 9 is a flowchart of another communication method according to this application.

Based on the foregoing descriptions, FIG. 9 shows another communication method according to an embodiment of this application. A procedure of the method may include the following steps.

Step 901: A session management function network element sends third information to a terminal device, where the third information includes IP address information of N EASs, and N is an integer greater than or equal to 2. That is, the terminal device receives the third information from the session management function network element.

Optionally, the management function network element may send the third information to the terminal device by using a session modification command.

Optionally, before step 901, the SMF receives the IP address information of the N EASs from an EASDF.

For example, the session management function network element may select IP address information of the $1^{st}$ EAS in the IP address information of the N EASs as third IP address information.

In an example implementation, the session management function network element may further determine, in the IP address information of the N EASs, IP address information of M EASs that corresponds to a DNAI, to obtain an EAS IP address information set, where the IP address information of the M EASs corresponds to a same DNAI, M is an integer greater than or equal to 2, and M is less than or equal to N.

Optionally, the M EASs corresponding to the IP address information of the M EASs are EASs preselected by the session management function network element.

Optionally, the session management function network element determines the IP address information of the M EASs based on one or more of local configuration information, policy information from a PCF, analytics data from an NWDAF, an EAS status, a location of the UE, and the like. For example, the session management function network element first selects an IP address of one EAS based on the foregoing information, and then selects, from the IP address information of the N EASs. IP address information that corresponds to a same DNAI as the selected IP address information of the EAS, to form the EAS IP address information set.

In an optional implementation, the session management function network element may determine one piece of IP address information in the IP address information of the N EASs, determine a corresponding DNAI based on the determined IP address information and the EAS deployment information, and insert a fourth traffic routing point, namely, a fourth ULCL/BP, based on the determined DNAI. Alternatively, in another optional implementation, the session management function network element may insert a fourth traffic routing point, namely, a fourth ULCL/BP, based on the DNAI corresponding to the EAS IP address information set.

Optionally, the SMF determines the third IP address information based on the one or more of the local configuration information, the policy information from the PCF, the analytics data from the NWDAF, the EAS status, the location of the UE, and the like.

In an example, the third information may further include the EAS IP address information set.

Optionally, the third information may further indicate that the M EASs about the EAS IP address information set are the EASs preselected by the session management network element. The EASs preselected by the session management function network element are the EASs preselected by the session management function network element, so that a final EAS is determined in the EASs.

In another example, the IP address information of the N EASs that is included in the third information may include the EAS IP address information set. That is, the IP address information of the N EASs in the third information may exist in a form of two parts: the EAS IP address information set and other remaining EAS IP address information.

Step 902: The terminal device determines second IP address information in the IP address information of the N EASs, where the second IP address information corresponds to a second EAS, and the N EASs include the second EAS.

Optionally, step 902 may alternatively be described as follows: the terminal device determines the second IP address information based on the third information.

Optionally, when the third information includes the EAS IP address information set, or the IP address information of the N EASs includes the EAS IP address information set, the terminal device may select, from the IP address information of the N EASs, IP address information that belongs to the EAS IP address information set. That is, in a case, the second IP address information may belong to the EAS IP address information set. Certainly, in a case, when the third information includes the EAS IP address information set, or the IP address information of the N EASs includes the EAS IP address information set, the terminal device may not select appropriate IP address information from the EAS IP address information set. In this case, the second IP address information does not belong to the EAS IP address information set.

Step 903: The terminal device sends fourth information to the session management network element, where the fourth information indicates the second EAS selected by the terminal device. That is, the session management function network element receives the fourth information from the terminal device.

In an optional implementation, the fourth information includes the second IP address information.

In another optional implementation, the terminal device determines whether the second IP address information belongs to the EAS IP address information set; and if the second IP address information does not belong to the EAS IP address information set, the terminal device includes the second IP address information in the fourth information, where if the second IP address information belongs to the EAS IP address information set, the fourth information may not include the second IP address information.

Specifically, the terminal device may send the fourth information to the session management network element by using a session modification response. Alternatively, the fourth information is a session modification response.

Step 904: The session management function network element determines IP address information of a target EAS based on the fourth information.

For example, a method for determining, by the session management function network element, the IP address information of the target EAS based on the fourth information may be: when the fourth information includes the second IP address information, the session management function network element determines that the IP address information of the target EAS is the second IP address information; or when the fourth information does not include the second IP address information, the session management function network element determines that the IP address information of the target EAS is the third IP address information, where the third IP address information is determined by the session management function network element in the IP address information of the N EASs, the third IP address information corresponds to a third EAS, and the N EASs include the third EAS.

Optionally, the third IP address information may be one piece of IP address information in the EAS IP address information set.

Optionally, a DNAI corresponding to the third IP address information may be the DNAI based on which the fourth traffic routing point is inserted. Alternatively, it may be understood as that the third IP address information may be the EAS IP address information determined by the session management function network element in the foregoing process of inserting the fourth traffic routing point.

It should be noted that the step is an optional step. When step 904 is not performed, descriptions of step 905 are that the session management function network element inserts a target traffic routing point based on the fourth information.

Step 905: The session management function network element inserts the target traffic routing point based on the IP address information of the target EAS.

In an optional implementation, when the IP address information of the target EAS is the second IP address information, a method for inserting, by the session management function network element, the target traffic routing point based on the IP address information of the target EAS may be: the session management function network element updates the fourth traffic routing point to the target traffic routing point based on the IP address information of the target EAS. That is, when the session management function network element has inserted the fourth traffic routing point, the session management function network element determines that a traffic routing point needs to be re-inserted, and the session management function network element deletes the fourth traffic routing point, determines a DNAI based on the second IP address information and the EAS deployment information, and inserts the target traffic routing point based on the determined DNAI.

Optionally, the session management network element further inserts an L-PSA, and the L-PSA and the target traffic routing point are integrated or separated.

It should be understood that when the session management function network element has not inserted a traffic routing point, the session management function network element directly inserts the target traffic routing point based on the IP address information of the target EAS.

According to the communication method provided in this embodiment of this application, a traffic routing point and the local session anchor can be inserted based on the EAS IP address information selected by the terminal device, to satisfy a requirement of the terminal device. In addition, a problem that a location of the traffic routing point/the local anchor inserted by the session management function network element is inconsistent with an EAS IP selected by the terminal device is avoided, to optimize a user plane path.

Figure 10:
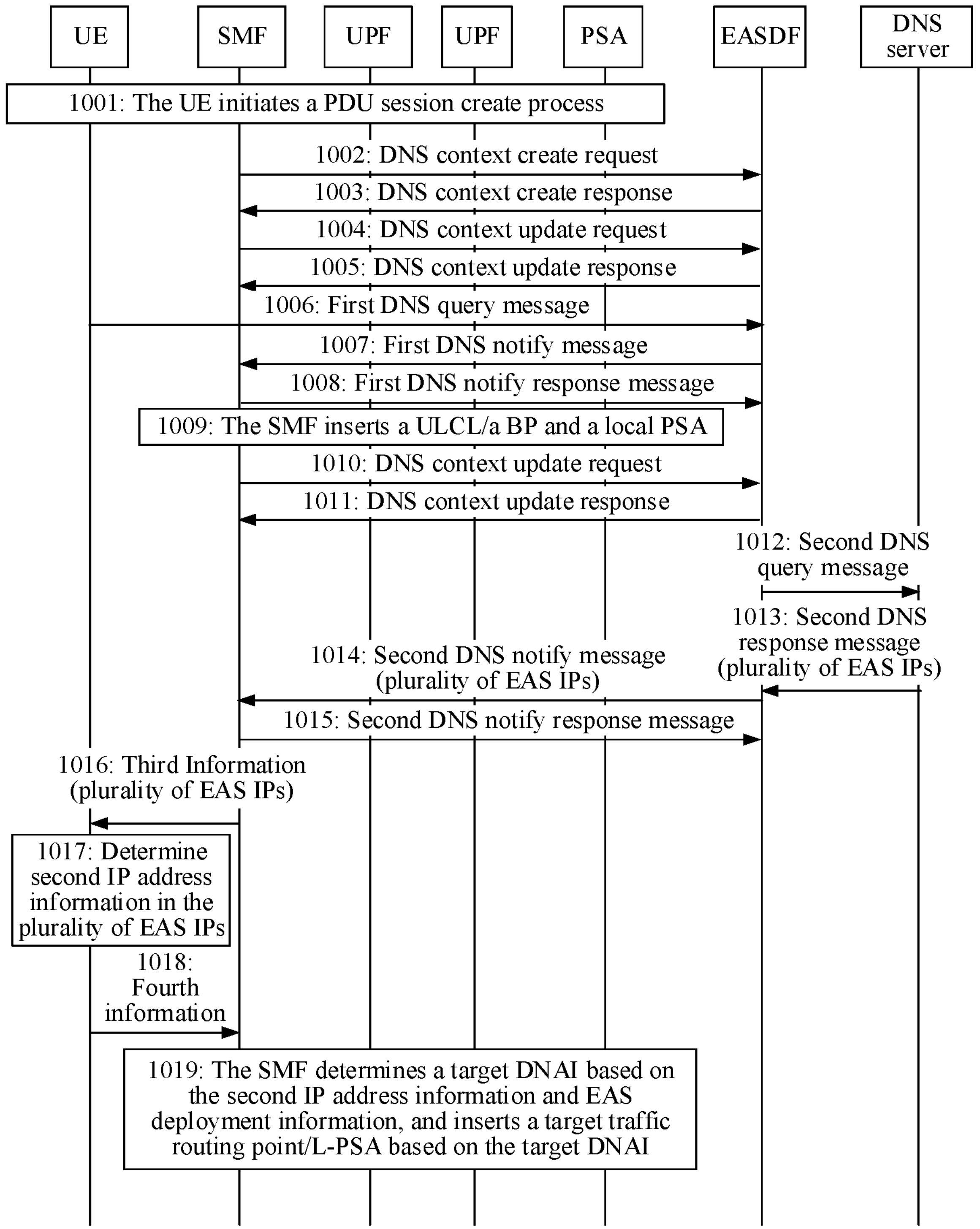
FIG. 10 is a flowchart of an example of another communication method according to this application.

Based on the foregoing descriptions, the following describes in detail, by using a specific example shown in FIG. 10, the communication method provided in the embodiment shown in FIG. 9. In the example shown in FIG. 10, descriptions are provided by using an example in which a terminal device is UE, an edge application server discovery function network element is an EASDF, a session management function network element is an SMF, a local session anchor is an L-PSA, and a traffic routing point is a ULCL/a BP. FIG. 10 shows an example of a communication method. For example, a procedure of the example may include the following steps.

Step 1001 to step 1015 are similar to step 301 to step 315. For specific content, refer to descriptions in step 301 to step 315.

It should be noted that a second DNS response message that is sent by a DNS server and that is received by an EASDF in step 1013 includes a plurality of pieces of EAS IP address information (referred to as a plurality of EAS IPs below); and a second DNS notify message sent by the EASDF to an SMF in step 1014 includes the plurality of pieces of EAS IP address information (referred to as the plurality of EAS IPs below), and the plurality of EAS IPs correspond to different DNAIs.

Step 1016: The SMF sends third information to UE, where the third information includes a plurality of EAS IPs.

Optionally, before step 1016, the SMF determines third IP address information (an EAS IP selected by the SMF).

Optionally, the SMF determines, based on the third IP address information and EAS deployment information, a DNAI corresponding to the third IP address information, and inserts the fourth traffic routing point/L-PSA based on the determined DNAI.

Optionally, the third information may further carry an EAS IP list (namely, the EAS IP address information set in the embodiment shown in FIG. 9); or the plurality of EAS IPs include an EAS IP list. For the EAS IP address information set, refer to descriptions in the embodiment shown in FIG. 9.

It should be noted that no sequence of step 1016 and step 1015 is specified.

Step 1017: The UE determines second IP address information in the plurality of EAS IPs, where the second IP address information corresponds to a second EAS.

Step 1018: The UE sends fourth information to the SMF, where the fourth information indicates the second EAS selected by the UE.

Optionally, the fourth information carries the second IP address information.

Optionally, when the second IP address information is not in the EAS IP list, the fourth information sent by the UE carries the second IP address information. When the second IP address information is in the EAS IP list, the fourth information sent by the UE may not carry the second IP address information.

Step 1019: The SMF determines a target DNAI based on the second IP address information and the EAS deployment information, and inserts a target traffic routing point/L-PSA based on the target DNAI.

Optionally, when the SMF has inserted the fourth traffic routing point/L-PSA (as shown in step 1016), the SMF determines, in step 1019, whether to re-insert a traffic routing point/a local PSA, that is, update the traffic routing point/the local session anchor. For details, refer to descriptions in step 904 and step 905 in FIG. 9.

According to the foregoing example, that a user plane path is good can be ensured, and a problem that the path is not good because EAS IPs on which the UE and the SMF are based are inconsistent is avoided.

Figure 11:
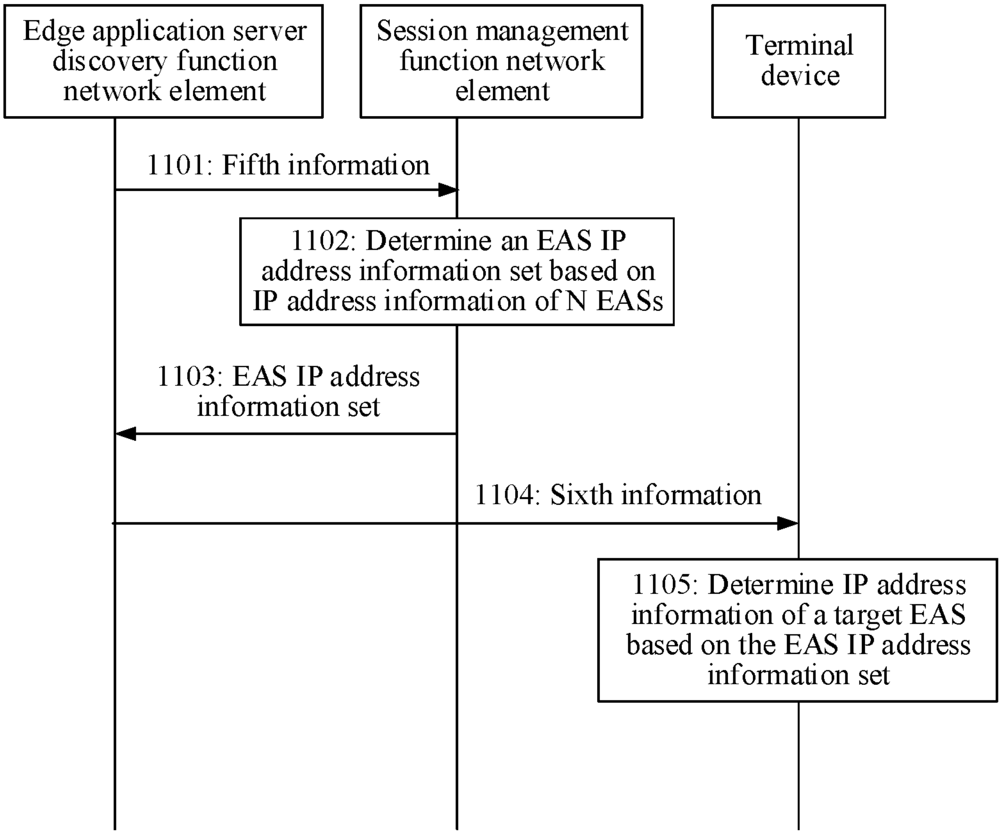
FIG. 11 is a flowchart of another communication method according to this application.

Based on the foregoing descriptions, FIG. 11 shows another communication method according to an embodiment of this application. A procedure of the method may include the following steps.

Step 1101: A session management function network element receives fifth information from an edge application server discovery function network element, where the fifth information includes IP address information of N EASs, and N is an integer greater than or equal to 2.

Step 1102: The session management function network element determines an EAS IP address information set based on the IP address information of the N EASs, where the EAS IP address information set includes IP address information of M EASs, the IP address information of the M EASs corresponds to a same DNAI, M is an integer greater than or equal to 2, and M is less than or equal to N.

For example, a method for determining, by the session management function network element, the EAS IP address information set based on the IP address information of the N EASs may be: the session management function network element selects fourth IP address information from the IP address information of the N EASs. The session management function network element determines a DNAI corresponding to the fourth IP address information. The session management function network element determines, in the IP address information of the N EASs, the IP address information of the M EASs that corresponds to the DNAI, to obtain the EAS IP address information set. The fourth IP address information corresponds to a fourth EAS, and the N EASs include the fourth EAS.

Optionally, the session management function network element determines the EAS IP address information set based on one or more of local configuration information, policy information from a PCF, analytics data from an NWDAF, an EAS status, a location of UE, and the like.

Optionally, the session management function network element inserts a traffic routing point and a local anchor based on the DNAI corresponding to the EAS IP address information set.

Step 1103: The session management function network element sends the EAS IP address information set to the edge application server discovery function network element. That is, the edge application server discovery function network element receives the edge application server EAS IP address information set from the session management function network element.

Step 1104: The edge application server discovery function network element sends sixth information to the terminal device, where the sixth information includes the EAS IP address information set. That is, the terminal device receives the sixth information from the edge application server discovery function network element.

Step 1105: The terminal device determines IP address information of a target EAS based on the EAS IP address information set.

According to the communication method provided in this embodiment of this application, the EAS IP address information set can be sent to the terminal device for selection by the terminal device. A problem that a location of the traffic routing point/the local anchor inserted by the session management function network element is inconsistent with an EAS IP selected by the terminal device is avoided, to optimize a service transmission path.

Figure 12:
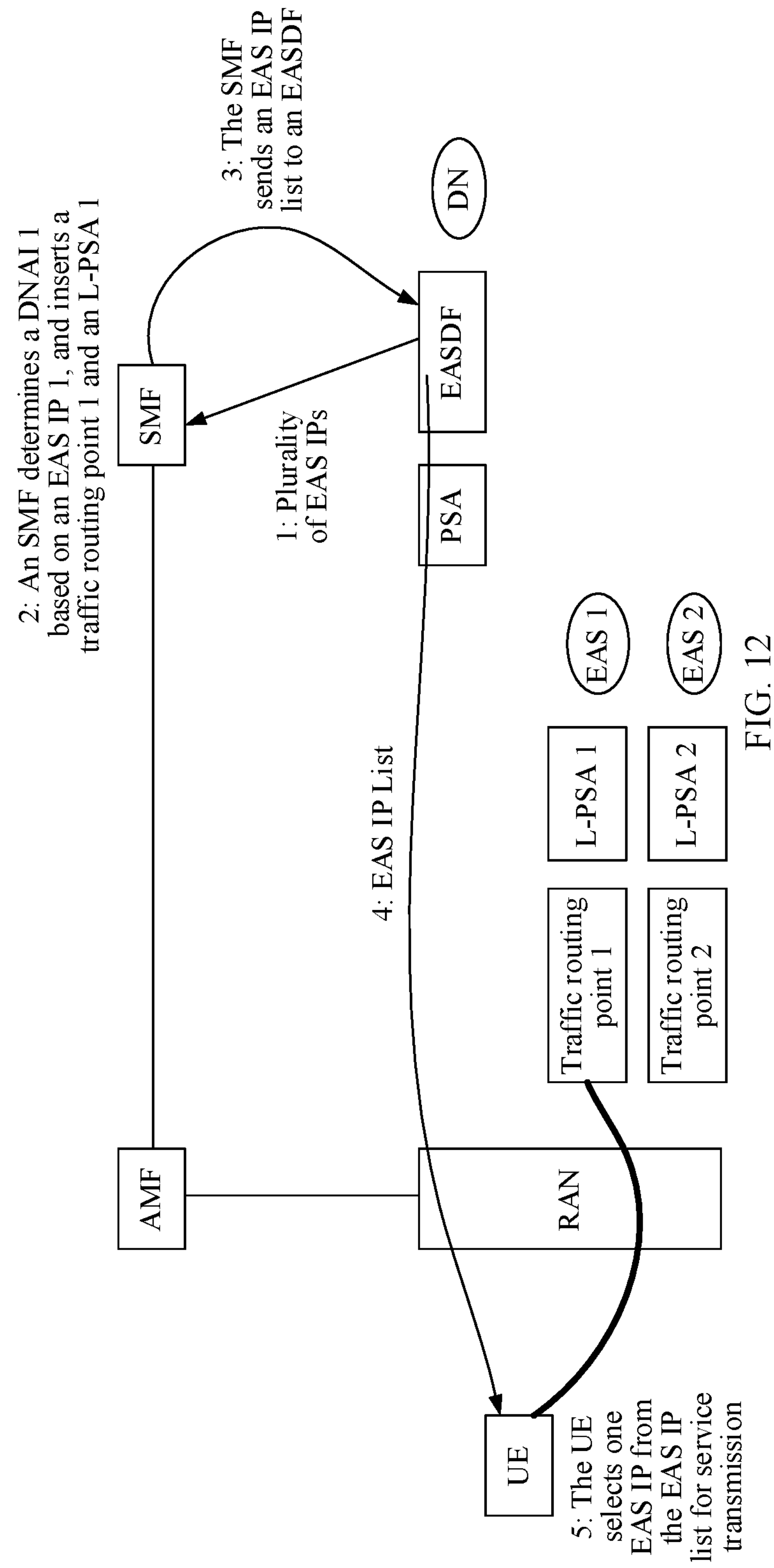
FIG. 12 is a schematic diagram of another scenario according to this application.
Figure 13:
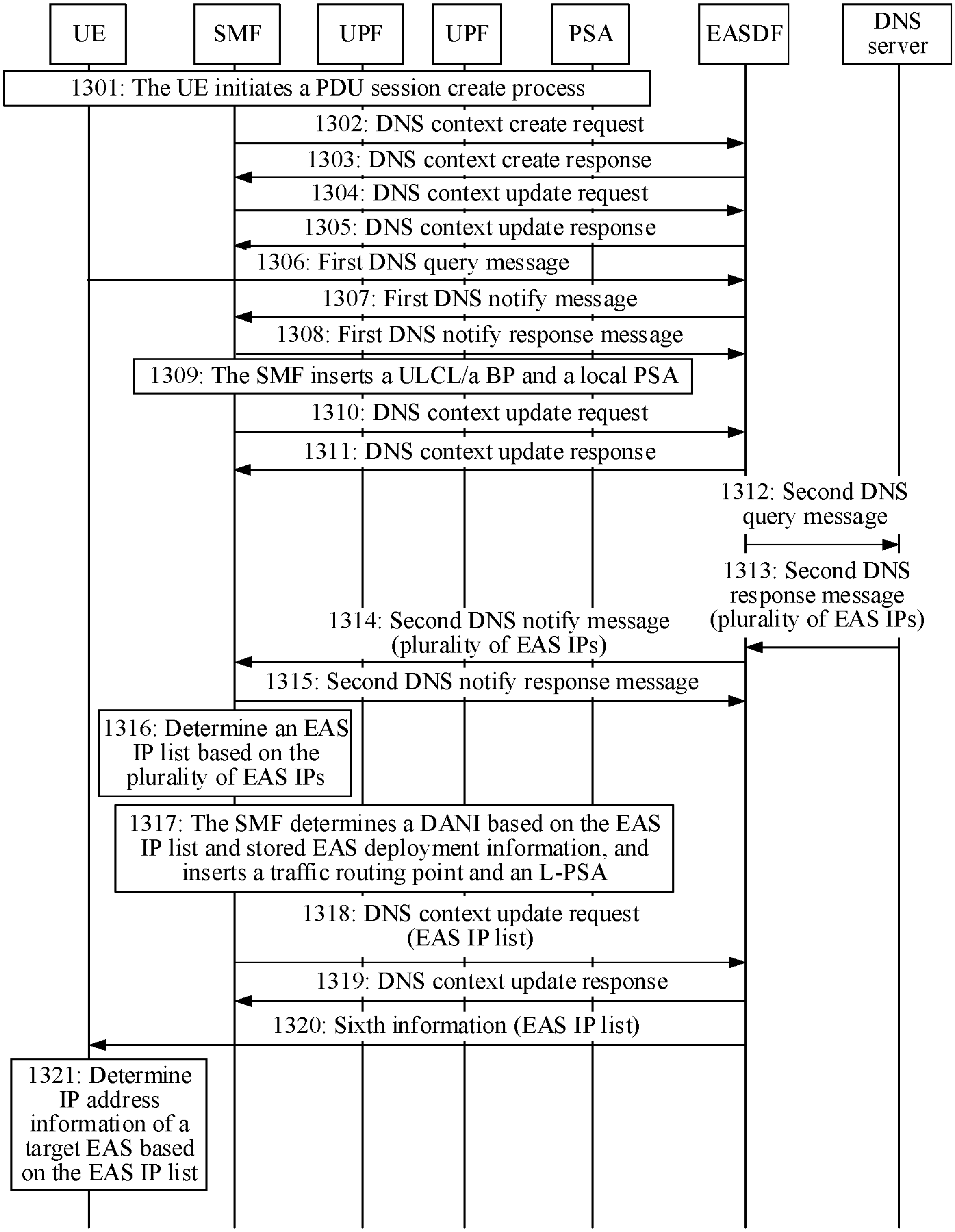
FIG. 13 is a flowchart of an example of another communication method according to this application.

Based on the foregoing descriptions, the following describes in detail, by using specific examples shown in FIG. 12 and FIG. 13, the communication method provided in the embodiment shown in FIG. 11. In the following examples shown in FIG. 12 and FIG. 13, descriptions are provided by using an example in which a terminal device is UE, an edge application server discovery function network element is an EASDF, a session management function network element is an SMF, a local session anchor is an L-PSA, and a traffic routing point is a ULCL/a BP.

FIG. 12 is a schematic diagram of an example scenario. In this scenario, an SMF determines an EAS IP list, and sends the EAS IP list to an EASDF, and the EASDF sends the EAS IP list to UE. Specifically, the SMF receives a plurality of EAS IPs (for example, including an EAS IP 1, an EAS IP 2, an EAS IP 3, an EAS IP 4, and an EAS IP 5) from the EASDF, and the SMF determines a corresponding DNAI 1 based on one EAS IP (for example, the EAS IP 1), and inserts an L-PSA 1 and a traffic routing point 1. (A transmission path is shown by a thick solid line in FIG. 12). The SMF determines an EAS IP list (for example, including the EAS IP 1, the EAS IP 2, and the EAS IP 3) corresponding to the DNAI 1, and sends the EAS IP list to the EASDF. The EASDF constructs a DNS response message based on the EAS IP list, where the DNS response message includes the EAS IP list; and sends the DNS response message to the UE. The UE selects one EAS IP from the EAS IP list, and performs service transmission based on the selected EAS IP.

Based on the scenario shown in FIG. 12, FIG. 13 shows an example of a communication method. For example, a procedure of the example may include the following steps.

Step 1301 to step 1315 are similar to step 301 to step 315. For specific content, refer to descriptions in step 301 to step 315.

It should be noted that a second DNS response message sent by an EASDF to an SMF in step 1313 includes a plurality of pieces of EAS IP address information (referred to as a plurality of EAS IPs below); and a second DNS notify response message sent by the EASDF to the SMF in step 1314 includes the plurality of pieces of EAS IP address information (referred to as the plurality of EAS IPs below), and the plurality of EAS IPs correspond to different DNAIs.

Step 1316: The SMF determines an EAS IP list (namely, the EAS IP address information set in the embodiment shown in FIG. 11) based on the plurality of EAS IPs.

For example, the SMF selects fourth IP address information from the plurality of EAS IPs; the SMF determines a DNAI corresponding to the fourth IP address information; and the SMF determines, in the plurality of pieces of EAS IP address information, IP address information of M EASs that corresponds to the DNAI, to obtain the EAS IP address information set, namely, the EAS IP list. Specifically, the SMF may determine, based on the plurality of EAS IPs and EAS deployment information, EAS IPs corresponding to the same DNAI as the fourth IP address information, and make the determined EAS IP to form the EAS IP list.

Step 1317: The SMF determines the DANI based on the EAS IP list and the stored EAS deployment information, and inserts a traffic routing point and an L-PSA.

It should be noted that step 1317 is an optional step.

Step 1318 and step 1319 are similar to step 317 and step 318. For specific content, refer to descriptions in step 317 and step 318.

In step 1318, the SMF sends the EAS IP list to the EASDF. Optionally, the SMF sends the EAS IP list to the EASDF by using a DNS context update request. This is different from step 317.

Step 1320: The EASDF sends sixth information to UE, where the sixth information includes the EAS IP list.

Optionally, the EASDF may send the sixth information to the UE by using a DNS response message. Alternatively, the sixth information may be a DNS response message.

Step 1321: The UE determines IP address information of a target EAS based on the EAS IP list.

According to this example, when a service transmission path of the UE is optimized, the UE can select EAS IP address information. In other words, a problem that a location of the traffic routing point/the local anchor inserted by the session management function network element is inconsistent with an EAS IP selected by the terminal device is avoided, to optimize the service transmission path.

Figure 14:
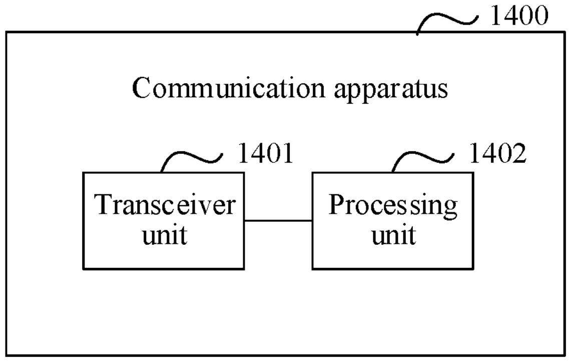
FIG. 14 is a schematic structural diagram of a communication apparatus according to this application.

Based on the foregoing embodiments, an embodiment of this application further provides a communication apparatus. Refer to FIG. 14. The communication apparatus 1400 may include a transceiver unit 1401 and a processing unit 1402. The transceiver unit 1401 is used by the communication apparatus 1400 to receive information (a message or data) or send information (a message or data), and the processing unit 1402 is configured to control and manage an action of the communication apparatus 1400. The processing unit 1402 may further control a step performed by the transceiver unit 1401.

For example, the communication apparatus 1400 may be the session management function network element (SMF) in the foregoing embodiments, and may be specifically a processor, a chip, a chip system, a functional module, or the like in the session management function network element. Alternatively, the communication apparatus 1400 may be the first device in the foregoing embodiments, and may be specifically a processor, a chip, a chip system, a functional module, or the like in the first device. Alternatively, the communication apparatus 1400 may be the terminal device (UE) in the foregoing embodiments, and may be specifically a processor, a chip, a chip system, a functional module, or the like in the terminal device. Alternatively, the communication apparatus 1400 may be the edge application server discovery function network element (EASDF) in the foregoing embodiments, and may be specifically a processor, a chip, a chip system, a functional module, or the like in the edge application server discovery function network element.

In an embodiment, when the communication apparatus 1400 is configured to implement functions of the session management function network element (SMF) in the embodiments in FIG. 4 to FIG. 8B, the communication apparatus 1400 may specifically include:

the transceiver unit 1401, configured to: send first information to a first device, where the first information indicates to send destination IP address information of a first packet of a terminal device to the session management network element; and receive the destination IP address information from the first device; and the processing unit 1402, configured to determine, based on the destination IP address information, a target local session anchor that serves the terminal device.

In an example, the first information further indicates the first device to send the destination IP address information of the first packet to the session management network element after the first device determines that the destination IP address information satisfies a first condition.

Optionally, the first condition is: the destination IP address information is different from first IP address information, where the first IP address information is IP address information that is of one edge application server EAS and that is determined by the session management function network element based on IP address information of N EASs that is obtained from an edge application server discovery function network element, and N is an integer greater than or equal to 2; or the destination IP address information does not belong to an IP address information set, where the IP address information set is IP address information of M edge application servers EASs that is determined by the session management function network element based on IP address information of N EASs that is obtained from an edge application server discovery function network element, the IP address information of the M EASs corresponds to a same data network access identifier DNAI, M is an integer greater than or equal to 2, and M is less than or equal to N.

In an optional implementation, when determining, based on the destination IP address information, the target local session anchor, the processing unit 1402 is specifically configured to determine a second local session anchor as the target local session anchor based on the destination IP address information, and delete a first local session anchor, where the first local session anchor is inserted by the session management function network element based on a first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2; and the second local session anchor corresponds to the destination IP address information.

Optionally, the transceiver unit 1401 is further configured to receive the IP address information of the N edge application servers EASs from the edge application server discovery function network element, where N is an integer greater than or equal to 2. The processing unit 1402 is further configured to determine, based on the IP address information of the N EASs, to insert the first device as a first traffic routing point.

For example, the processing unit 1402 is further configured to determine, based on the determined target local session anchor, whether to keep the first device as the first traffic routing point.

Optionally, the first device is the first local session anchor, a first traffic routing point, or a session anchor PSA, where the first local session anchor and the first traffic routing point are inserted by the session management function network element based on the first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2.

In a possible manner, the transceiver unit 1401 is further configured to receive second information from an edge application server discovery function network element, where the second information includes internet protocol IP address information of N edge application servers EASs, and N is an integer greater than or equal to 2. The processing unit 1402 is further configured to determine a plurality of data network access identifiers DNAIs corresponding to the IP address information of the N EASs, and insert a plurality of local session anchors and at least one traffic routing point based on the plurality of DNAIs, where one DNAI corresponds to one local session anchor. The at least one traffic routing point includes the first device.

Optionally, when determining, based on the destination IP address information, the target local session anchor, the processing unit 1402 is specifically configured to: determine a first DNAI corresponding to the destination IP address information; and determine that a local session anchor corresponding to the first DNAI is the target local session anchor, and delete a local session anchor corresponding to a DNAI other than the first DNAI in the plurality of DNAIs.

In an example, when the plurality of local session anchors correspond to one traffic routing point, the first device is the traffic routing point.

In another example, when each of the plurality of local session anchors corresponds to one traffic routing point, the first device is a traffic routing point that is in a plurality of traffic routing points and that is closest to the terminal device.

Optionally, the processing unit 1402 is further configured to delete at least one to-be-deleted traffic routing point, where the at least one to-be-deleted traffic routing point corresponds to the DNAI other than the first DNAI in the plurality of DNAIs, and the first DNAI is a DNAI corresponding to the destination IP address information.

In another embodiment, when the communication apparatus 1400 is configured to implement functions of the first device (for example, the first L-PSA, the first ULCL/BP, the second ULCL/BP, or the third ULCL/BP) in the embodiments in FIG. 4 to FIG. 8B, the communication apparatus 1400 may specifically include:

the transceiver unit 1401, configured to receive first information from a session management function network element, where the first information indicates to send, to the session management network element, destination IP address information of a first packet from a terminal device; and the processing unit 1402, configured to: detect the first packet of the terminal device, and determine the destination IP address information of the first packet; and determine whether to send the destination IP address information to the session management function network element.

For example, the first information further indicates the first device to send the destination IP address information of the first packet to the session management network element after the first device determines that the destination IP address information satisfies a first condition.

Optionally, when determining whether to send the destination IP address information to the session management function network element, the processing unit 1402 is specifically configured to: determine whether the destination IP address information satisfies the first condition; and if the destination IP address information satisfies the first condition, send the destination IP address information to the session management function network element; or if the destination IP address does not satisfy the first condition, skip sending the destination IP address information to the session management function network element.

For example, the first condition is: the destination IP address information is different from first IP address information, where the first IP address information is IP address information that is of one edge application server EAS and that is determined by the session management function network element based on IP address information of N EASs that is obtained from an edge application server discovery function network element, and N is an integer greater than or equal to 2; or the destination IP address information does not belong to an IP address information set, where the IP address information set is IP address information of M edge application servers EASs that is determined by the session management function network element based on IP address information of N EASs that is obtained from an edge application server discovery function network element, the IP address information of the M EASs corresponds to a same data network access identifier DNAI, M is an integer greater than or equal to 2, and M is less than or equal to N.

Optionally, when determining whether to send the destination IP address information to the session management function network element, the processing unit 1402 is specifically configured to control the transceiver unit 1401 to send the destination IP address information to the session management function network element.

In an example, the first device is a first local session anchor, a first traffic routing point, or a session anchor PSA, where the first local session anchor and the first traffic routing point are inserted by the session management function network element based on a first data network access identifier DNAI corresponding to the first IP address information, the first IP address information is the IP address information that is of the one edge application server EAS and that is determined by the session management function network element based on the IP address information of the N EASs that is obtained from the edge application server discovery function network element, and N is the integer greater than or equal to 2.

In another example, the first device is one traffic routing point corresponding to a plurality of local session anchors, where the plurality of local session anchors are inserted by the session management function network element based on a plurality of DNAIs, the plurality of DNAIs are determined by the session management function network element based on internet protocol IP address information of N edge application servers EASs that is obtained from an edge application server discovery function network element, and N is an integer greater than or equal to 2.

In still another example, the first device is a traffic routing point that is in a plurality of traffic routing points and that is closest to the terminal device, where the plurality of traffic routing points one-to-one correspond to a plurality of local session anchors, the plurality of local session anchors are inserted by the session management function network element based on a plurality of DNAIs, the plurality of DNAIs are determined by the session management function network element based on internet protocol IP address information of N edge application servers EASs that is obtained from an edge application server discovery function network element, and N is an integer greater than or equal to 2.

In an embodiment, when the communication apparatus 1400 is configured to implement functions of the terminal device (UE) in the embodiments in FIG. 9 and FIG. 10, the communication apparatus 1400 may specifically include:

the transceiver unit 1401, configured to receive third information from a session management function network element, where the third information includes internet protocol IP address information of N edge application servers EASs, and N is an integer greater than or equal to 2; and the processing unit 1402, configured to determine second IP address information in the IP address information of the N EASs, where the second IP address information corresponds to a second EAS, and the N EASs include the second EAS, where the transceiver unit 1401 is further configured to send fourth information to the session management network element, where the fourth information indicates the second EAS selected by the terminal device.

In an example, the third information further includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N.

In another example, the IP address information of the N EASs includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N.

Optionally, the processing unit 1402 is further configured to: determine whether the second IP address information belongs to the EAS IP address information set; and if the second IP address information does not belong to the EAS IP address information set, include, for the terminal device, the second IP address information in the fourth information, where if the second IP address information belongs to the EAS IP address information set, the fourth information does not include the second IP address information.

Optionally, the fourth information includes the second IP address information.

In another embodiment, when the communication apparatus 1400 is configured to implement functions of the session management function network element (SMF) in the embodiments in FIG. 9 and FIG. 10, the communication apparatus 1400 may specifically include:

the transceiver unit 1401, configured to: send third information to a terminal device, where the third information includes internet protocol IP address information of N edge application servers EASs, and N is an integer greater than or equal to 2; and receive fourth information from the terminal device, where the fourth information indicates a second EAS selected by the terminal device, and the N EASs include the second EAS; and the processing unit 1402, configured to: determine IP address information of a target EAS based on the fourth information, and insert a target traffic routing point based on the IP address information of the target EAS.

Optionally, the fourth information includes second IP address information, or the fourth information does not include second IP address information; and the second IP address information corresponds to the second EAS. When determining the IP address information of the target EAS based on the fourth information, the processing unit 1402 is specifically configured to: when the fourth information includes the second IP address information, determine that the IP address information of the target EAS is the second IP address information; or when the fourth information does not include the second IP address information, determine that the IP address information of the target EAS is third IP address information, where the third IP address information is determined by the session management function network element in the IP address information of the N EASs, the third IP address information corresponds to a third EAS, and the N EASs include the third EAS.

In an example, the third information further includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N.

In another example, the IP address information of the N EASs includes an EAS IP address information set, the EAS IP address information set includes IP address information of M EASs, the IP address information of the M EASs corresponds to a same data network access identifier DNAI, the M EASs corresponding to the IP address information of the M EASs are EASs preselected by the session management network element, M is an integer greater than or equal to 2, and M is less than or equal to N.

Optionally, when the fourth information includes the second IP address information, the second IP address information does not belong to the EAS IP address information set; or when the fourth information does not include the second IP address information, the second IP address information belongs to the EAS IP address information set.

For example, the processing unit 1402 is further configured to: determine a DNAI corresponding to the third IP address information, and insert a fourth traffic routing point based on the DNAI.

Optionally, the processing unit 1402 is further configured to determine, in the IP address information of the N EASs, the IP address information of the M EASs that corresponds to the DNAI, to obtain the EAS IP address information set.

In an optional implementation, when the IP address information of the target EAS is the second IP address information, when inserting the target traffic routing point based on the IP address information of the target EAS, the processing unit 1402 is specifically configured to update the fourth traffic routing point to the target traffic routing point based on the IP address information of the target EAS.

In another embodiment, when the communication apparatus 1400 is configured to implement functions of the session management function network element (SMF) in the embodiments in FIG. 11 to FIG. 13, the communication apparatus 1400 may specifically include:

the transceiver unit 1401, configured to receive fifth information from an edge application server discovery function network element, where the fifth information includes internet protocol IP address information of N edge application servers EASs, and N is an integer greater than or equal to 2; and the processing unit 1402, configured to determine an EAS IP address information set based on the IP address information of the N EASs, where the EAS IP address information set includes IP address information of M EASs, the IP address information of the M EASs corresponds to a same data network access identifier DNAI, M is an integer greater than or equal to 2, and M is less than or equal to N, where the transceiver unit 1401 is further configured to send the EAS IP address information set to the edge application server discovery function network element.

Optionally, when determining the EAS IP address information set based on the IP address information of the N EASs, the processing unit 1402 is specifically configured to: select fourth IP address information from the IP address information of the N EASs, where the fourth IP address information corresponds to a fourth EAS, and the N EASs include the fourth EAS; determine a DNAI corresponding to the fourth IP address information; and determine, in the IP address information of the N EASs, the IP address information of the M EASs that corresponds to the DNAI, to obtain the EAS IP address information set.

In another embodiment, when the communication apparatus 1400 is configured to implement functions of the edge application server discovery function network element (EASDF) in the embodiments in FIG. 11 to FIG. 13, the communication apparatus 1400 may specifically include:

the transceiver unit 1401, configured to: receive an edge application server EAS IP address information set from a session management function network element, where the EAS IP address information set includes IP address information of M EASs, the IP address information of the M EASs corresponds to a same data network access identifier DNAI, and M is an integer greater than or equal to 2; and send sixth information to a terminal device, where the sixth information includes the EAS IP address information set; and the processing unit 1402, configured to control the transceiver unit 1401 to perform the foregoing sending and receiving operations.

In another embodiment, when the communication apparatus 1400 is configured to implement functions of the terminal device (UE) in the embodiments in FIG. 11 to FIG. 13, the communication apparatus 1400 may specifically include:

the transceiver unit 1401, configured to receive sixth information from an edge application server discovery function network element, where the sixth information includes an edge application server EAS IP address information set, the EAS IP address information set includes IP address information of M EASs, the IP address information of the M EASs corresponds to a same data network access identifier DNAI, and M is an integer greater than or equal to 2; and the processing unit 1402, configured to determine IP address information of a target EAS based on the EAS IP address information set.

It should be noted that, in embodiments of this application, division into the units is an example, and is merely logical function division. During actual implementation, another division manner may be used. Functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, technical solutions in this application may be implemented in the form of a software product. The computer software product is stored in a storage medium and includes several instructions for instructing a computer device (which may be a personal computer, a server, a network device, or the like) or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

Figure 15:
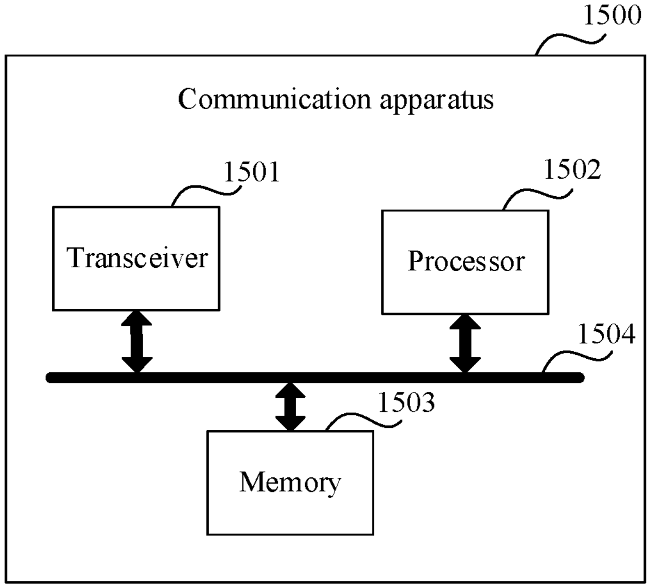
FIG. 15 is a structural diagram of a communication apparatus according to this application.

Based on the foregoing embodiments, an embodiment of this application further provides a communication apparatus. Refer to FIG. 15. The communication apparatus 1500 may include a transceiver 1501 and a processor 1502. Optionally, the communication apparatus 1500 may further include a memory 1503. The memory 1503 may be disposed inside the communication apparatus 1500, or may be disposed outside the communication apparatus 1500. The processor 1502 may control the transceiver 1501 to receive and send information or data.

Specifically, the processor 1502 may be a central processing unit (CPU), a network processor (NP), or a combination of the CPU and the NP. The processor 1502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 1501, the processor 1502, and the memory 1503 are connected to each other. Optionally, the transceiver 1501, the processor 1502, and the memory 1503 are interconnected through a bus 1504. The bus 1504 may be a peripheral component interconnect (PCI) bus, an extended industry standard architecture (EISA) bus, or the like. Buses may be classified into an address bus, a data bus, a control bus, and the like. For ease of representation, only one thick line is for representing the bus in FIG. 15, but this does not mean that there is only one bus or only one type of bus.

In an optional implementation, the memory 1503 is configured to store a program and the like. Specifically, the program may include program code, and the program code includes computer operation instructions. The memory 1503 may include a RAM, and may further include a non-volatile memory, for example, one or more magnetic disk memories. The processor 1502 executes the application program stored in the memory 1503, to implement the foregoing function, thereby implementing functions of the communication apparatus 1500.

For example, the communication apparatus 1500 may be the session management function network element (SMF) in the foregoing embodiments, may be the first device in the foregoing embodiments, may be the terminal device (UE) in the foregoing embodiments, or may be the edge application server discovery function network element (EASDF) in the foregoing embodiments.

In an embodiment, when the communication apparatus 1500 implements functions of the session management function network element (SMF) in the embodiments shown in FIG. 4 to FIG. 8B, the transceiver 1501 may implement sending and receiving operations performed by the session management function network element (SMF) in the embodiments shown in FIG. 4 to FIG. 8B, and the processor 1502 may implement an operation other than the sending and receiving operations and performed by the session management function network element (SMF) in the embodiments shown in FIG. 4 to FIG. 8B. For related specific descriptions, refer to related descriptions in the embodiments shown in FIG. 4 to FIG. 8B.

In an embodiment, when the communication apparatus 1500 implements functions of the first device (for example, the first L-PSA, the first ULCL/BP, the second ULCL/BP, or the third ULCL/BP) in the embodiment shown in FIG. 4 to FIG. 8B, the transceiver 1501 may implement sending and receiving operations performed by the first device (for example, the first L-PSA, the first ULCL/BP, the second ULCL/BP, or the third ULCL/BP) in the embodiments shown in FIG. 4 to FIG. 8B, and the processor 1502 may implement an operation other than the sending and receiving operations and performed by the first device (for example, the first L-PSA, the first ULCL/BP, the second ULCL/BP, or the third ULCL/BP) in the embodiment shown in FIG. 4 to FIG. 8B. For related specific descriptions, refer to related descriptions in the embodiments shown in FIG. 4 to FIG. 8B.

In an embodiment, when the communication apparatus 1500 implements functions of the terminal device (UE) in the embodiments shown in FIG. 9 and FIG. 10, the transceiver 1501 may implement sending and receiving operations performed by the terminal device (UE) in the embodiments shown in FIG. 9 and FIG. 10, and the processor 1502 may implement an operation other than the sending and receiving operations and performed by the terminal device (UE) in the embodiments shown in FIG. 9 and FIG. 10. For related specific descriptions, refer to related descriptions in the embodiments shown in FIG. 9 and FIG. 10.

In an embodiment, when the communication apparatus 1500 implements functions of the session management function network element (SMF) in the embodiments shown in FIG. 9) and FIG. 10, the transceiver 1501 may implement sending and receiving operations performed by the session management function network element (SMF) in the embodiments shown in FIG. 9 and FIG. 10, and the processor 1502 may implement an operation other than the sending and receiving operations and performed by the session management function network element (SMF) in the embodiments shown in FIG. 9 and FIG. 10. For related specific descriptions, refer to related descriptions in the embodiments shown in FIG. 9 and FIG. 10.

In an embodiment, when the communication apparatus 1500 implements functions of the session management function network element (SMF) in the embodiments shown in FIG. 11 to FIG. 13, the transceiver 1501 may implement sending and receiving operations performed by the session management function network element (SMF) in the embodiments shown in FIG. 11 to FIG. 13, and the processor 1502 may implement an operation other than the sending and receiving operations and performed by the session management function network element (SMF) in the embodiments shown in FIG. 11 to FIG. 13. For related specific descriptions, refer to related descriptions in the embodiments shown in FIG. 11 to FIG. 13.

In an embodiment, when the communication apparatus 1500 implements functions of the edge application server discovery function network element (EASDF) in the embodiments shown in FIG. 11 to FIG. 13, the transceiver 1501 may implement sending and receiving operations performed by the edge application server discovery function network element (EASDF) in the embodiments shown in FIG. 11 to FIG. 13, and the processor 1502 may implement an operation other than the sending and receiving operations and performed by the edge application server discovery function network element (EASDF) in the embodiments shown in FIG. 11 to FIG. 13. For related specific descriptions, refer to related descriptions in the embodiments shown in FIG. 11 to FIG. 13.

In an embodiment, when the communication apparatus 1500 implements functions of the terminal device (UE) in the embodiments shown in FIG. 11 to FIG. 13, the transceiver 1501 may implement sending and receiving operations performed by the terminal device (UE) in the embodiments shown in FIG. 11 to FIG. 13, and the processor 1502 may implement an operation other than the sending and receiving operations and performed by the terminal device (UE) in the embodiments shown in FIG. 11 to FIG. 13. For related specific descriptions, refer to related descriptions in the embodiments shown in FIG. 11 to FIG. 13.

Based on the foregoing embodiments, an embodiment of this application provides a communication system. The communication system may include the terminal device, the session management function network element, the first device, the edge application server discovery function network element, and the like in the foregoing embodiments.

An embodiment of this application further provides a computer-readable storage medium. The computer-readable storage medium is configured to store a computer program. When the computer program is executed by a computer, the computer may implement the communication methods provided in the foregoing method embodiments.

An embodiment of this application further provides a computer program product. The computer program product is configured to store a computer program. When the computer program is executed by a computer, the computer may implement the communication methods provided in the foregoing method embodiments.

An embodiment of this application further provides a chip, including a processor. The processor is coupled to a memory, and is configured to invoke a program in the memory, so that the chip implements the communication methods provided in the foregoing method embodiments.

An embodiment of this application further provides a chip. The chip is coupled to a memory and the chip is configured to implement the communication methods provided in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be for implementing each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specified function in one or more procedures in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specified function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method comprising:

receiving, by a communication apparatus, information from an edge application server discovery function network element, wherein the information comprises internet protocol (IP) address information of N edge application servers (EASs), and wherein N is an integer greater than or equal to 2;

determining, by the communication apparatus, an EAS IP address information set based on the IP address information of the N EASs, wherein the EAS IP address information set comprises IP address information of M EASS, wherein the IP address information of the EAS IP address information set corresponds to a same data network access identifier (DNAI), wherein the EAS IP address information set is associated with a common user-plane routing path established by the communication apparatus, and wherein M is an integer less than or equal to N; and sending, by the communication apparatus, the EAS IP address information set to a terminal device by way of the edge application server discovery function network element, wherein the EAS IP address information set enables selection, from among the M EASs, of an EAS corresponding to the user-plane routing path established by the communication apparatus.

2. The method according to claim 1, wherein determining the EAS IP address information set based on the IP address information of the N EASs comprises:

selecting first IP address information from the IP address information of the N EASs, wherein the first IP address information corresponds to a first EAS of the N EASs;

determining the DNAI corresponding to the first IP address information; and determining, in the IP address information of the N EASs, the IP address information of the M EASs that corresponds to the DNAI, to obtain the EAS IP address information set.

3. The method according to claim 1, wherein determining the EAS IP address information set is further based on one or more of:

local configuration information, policy information from a policy control function network element, analytics data from a network data analytics function network element, an EAS status, or a location of the terminal device.

4. The method according to claim 1, wherein the communication apparatus is a session management function network element or a chip in a session management function network element.

5. The method according to claim 1, wherein the EAS IP address information set excludes IP address information of an EAS corresponding to a DNAI different from the same DNAI.

6. The method according to claim 1, wherein the common user-plane routing path established by the communication apparatus comprises a traffic routing point or a local session anchor corresponding to the same DNAI.

7. The method according to claim 1, wherein the communication apparatus is configured to update the user-plane routing path based on an EAS selected from among the N EASs by the terminal device.

8. The method according to claim 1, wherein the communication apparatus determines the EAS IP address information set such that each EAS in the EAS IP address information set corresponds to a same local session anchor.

9. The method according to claim 1, wherein the communication apparatus determines the EAS IP address information set based on a user-plane traffic routing policy.

10. A communication method comprising:

receiving, by a communication apparatus, information from an edge application server discovery function network element, wherein the information comprises an edge application server (EAS) internet protocol (IP) address information set, wherein the EAS IP address information set comprises IP address information of M EASS, wherein the IP address information in the EAS IP address information set corresponds to a same data network access identifier (DNAI), wherein the EAS IP address information set is associated with a common user-plane routing path, and wherein M is an integer; and determining, by the communication apparatus, IP address information of a target EAS based on the EAS IP address information set, wherein the target EAS is selected from among the M EASs to correspond to the common user-plane routing path.

11. The method according to claim 10, wherein the common user-plane routing path comprises a traffic routing point or a local session anchor corresponding to the same DNAI.

12. The method according to claim 10, wherein the target EAS is selected from among the M EASs excluding an EAS corresponding to a DNAI different from the same DNAI.

13. The method according to claim 10, wherein the IP address information of the target EAS enables updating of the common user-plane routing path by updating a traffic routing point and/or a local session anchor corresponding to the same DNAI.

14. The method according to claim 10, wherein the target EAS is selected based on a location of a terminal device or wherein the target EAS corresponds to a local session anchor inserted for a terminal device.

15. A communication apparatus comprising:

at least one processor; and at least one memory coupled to the at least one processor and storing programming instructions that, when executed by the at least one processor, facilitate performance of the following by the apparatus:

receiving information from an edge application server discovery function network element, wherein the information comprises internet protocol (IP) address information of N edge application servers (EASs), and wherein N is an integer greater than or equal to 2;

determining an EAS IP address information set based on the IP address information of the N EASs, wherein the EAS IP address information set comprises IP address information of M EASs, wherein the IP address information of the EAS IP address information set corresponds to a same data network access identifier (DNAI), wherein the EAS IP address information set is associated with a common user-plane routing path established by the communication apparatus, and wherein M is an integer less than or equal to N; and sending the EAS IP address information set to the edge application server discovery function network element, wherein the EAS IP address information set enables selection, from among the M EASs, of an EAS corresponding to the user-plane routing path established by the communication apparatus.

16. The apparatus according to claim 15, wherein determining the EAS IP address information set based on the IP address information of the N EASs comprises:

selecting first IP address information from the IP address information of the N EASs, wherein the first IP address information corresponds to a first EAS of the N EASs;

determining the DNAI corresponding to the first IP address information; and determining, in the IP address information of the N EASs, the IP address information of the M EASs that corresponds to the DNAI, to obtain the EAS IP address information set.

17. The apparatus according to claim 15, wherein determining the EAS IP address information set is further based on one or more of:

local configuration information, policy information from a policy control function network element, analytics data from a network data analytics function network element, an EAS status, or a location of a terminal device.

18. The apparatus according to claim 15, wherein the apparatus is a session management function network element or a chip in a session management function network element.

19. The apparatus according to claim 15, wherein the apparatus is configured to determine whether the selected EAS corresponds to the same DNAI as the common user-plane routing path.

20. The apparatus according to claim 15, wherein the apparatus is configured to update the common user-plane routing path by updating a traffic routing point or a local session anchor based on IP address information corresponding to the selected EAS.

* * * * *